(12) United States Patent
Tong et al.

(10) Patent No.: US 11,849,037 B1
(45) Date of Patent: Dec. 19, 2023

(54) CROSS-REGION REPLICATION OF SECRETS

(71) Applicant: Amazon Technologies, Inc., Seattle, WA (US)

(72) Inventors: William Tong, Denver, CO (US); Joseph Baro, Bellevue, WA (US); Parimal Shirish Deshmukh, Seattle, WA (US); Kylan Joseph Kempster, Seattle, WA (US); Yan Wu, Seattle, WA (US); Graeme David Baer, Bellevue, WA (US); Steven K. Emelander, Kirkland, WA (US); Divya Sridhar, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 135 days.

(21) Appl. No.: 17/301,341

(22) Filed: Mar. 31, 2021

Related U.S. Application Data

(60) Provisional application No. 63/152,202, filed on Feb. 22, 2021.

(51) Int. Cl.
| | |
|---|---|
| *H04L 9/08* | (2006.01) |
| *H04L 67/1095* | (2022.01) |
| *G06F 9/54* | (2006.01) |
| *H04L 9/40* | (2022.01) |
| *G06F 3/0482* | (2013.01) |

(52) U.S. Cl.
CPC .......... *H04L 9/0891* (2013.01); *G06F 3/0482* (2013.01); *G06F 9/541* (2013.01); *H04L 9/0861* (2013.01); *H04L 63/0428* (2013.01); *H04L 67/1095* (2013.01)

(58) Field of Classification Search
CPC . H04L 9/0891; H04L 9/0861; H04L 63/0428; H04L 67/1095
See application file for complete search history.

(56) References Cited

U.S. PATENT DOCUMENTS

| | | | |
|---|---|---|---|
| 7,571,311 B2 * | 8/2009 | Ilac ...................... | H04L 9/0833 709/229 |
| 2020/0195719 A1 * | 6/2020 | Mehta ................. | H04L 67/1097 |
| 2020/0244455 A1 * | 7/2020 | Teitzel ................... | G06N 20/00 |
| 2020/0412806 A1 * | 12/2020 | Largman ............... | H04L 51/222 |
| 2022/0138220 A1 * | 5/2022 | Ahmad .................. | G06F 16/25 707/624 |

* cited by examiner

*Primary Examiner* — Esther B. Henderson
(74) *Attorney, Agent, or Firm* — Lee & Hayes, P.C.

(57) ABSTRACT

This disclosure describes techniques for managing the replication of a secret across different regions. A secrets management system (SMS) may be used to manage replication of secrets across different regions of the cloud that are in different geographic locations. Different input mechanisms, such as an API, a UI, or a CLI may be utilized to manage the replication of secrets. In some examples, upon detection of a replication message, the SMS reads the message, identifies the secret, and performs an action involving the secret. For instance, a secret identified within the replication message is accessed from the current region, and the secret is re-encrypted using a customer specified KMS key using customer credentials. The secret is then packaged into a secret replication message. An SRS in the replicated region reads this new secret replication message, accesses the secret that was replicated, and saves the secret in the replicated region.

20 Claims, 16 Drawing Sheets

US 11,849,037 B1

CROSS-REGION REPLICATION OF SECRETS

CROSS-REFERENCE TO RELATED APPLICATIONS

This application claims priority to U.S. Provisional Patent Application No. 63/152,202 entitled "Cross-Region Replication of Secrets," filed Feb. 22, 2021, which is incorporated herein by reference in its entirety.

BACKGROUND

Companies of all sizes are challenged with securing sensitive data. In many cases, a company may use "secrets" to protect sensitive data. Generally, a "secret" is any string or binary data that is to be kept or meant to be kept unknown or unseen by others. In many cases, secrets may be collection of name-value pairs that comprise the login information for a server or database, or some other computer resource. Managing secrets across different locations can be challenging. While some companies may attempt to manage secrets across different locations, this can be difficult, time-consuming, and error prone. For example, a company may spend a significant amount of time and money developing custom solutions to manage secrets.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
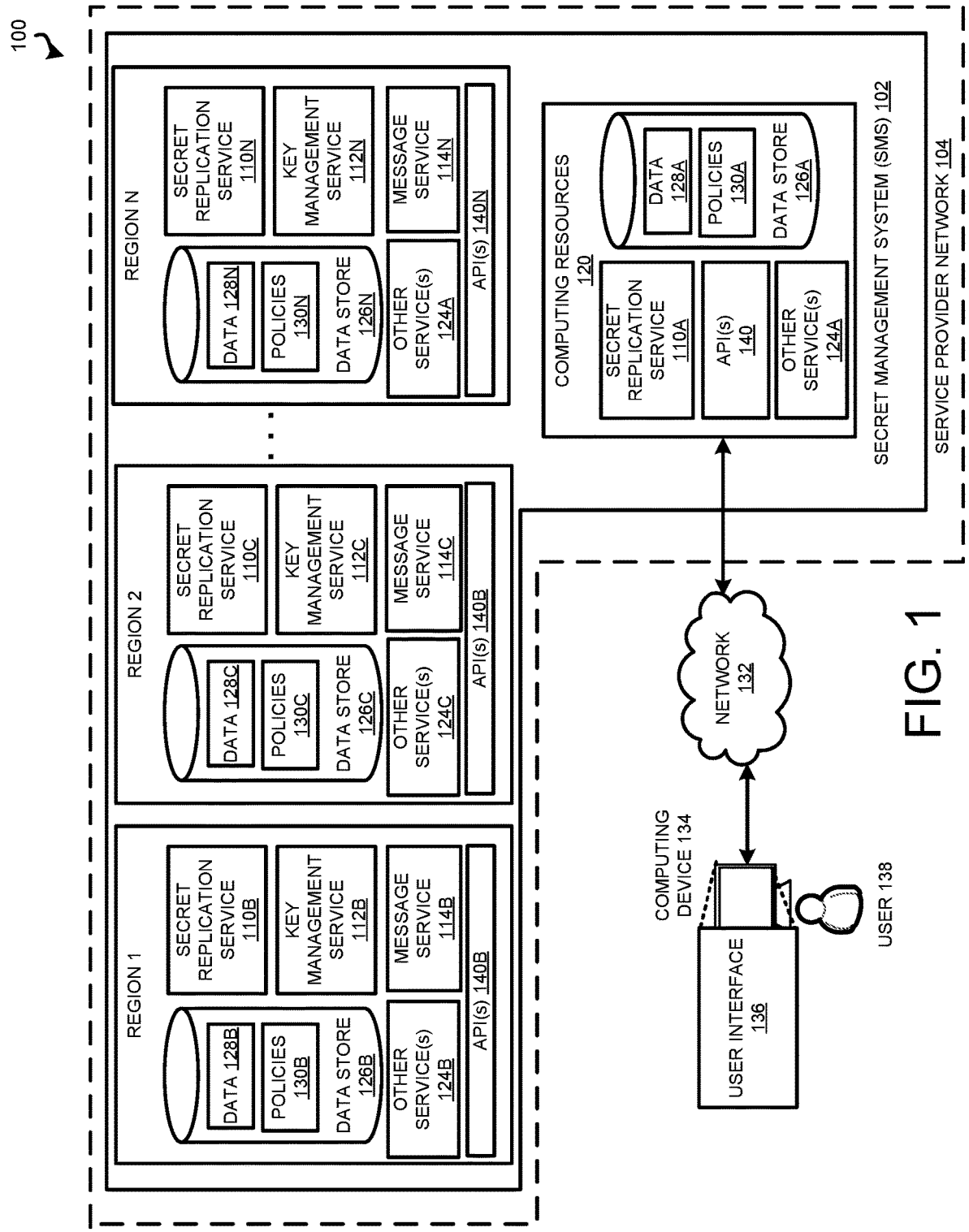
FIG. 1 is a software and network architecture diagram showing aspects of cross-region replication of secrets across different regions of a network.

This disclosure relates to techniques for cross-region replication of secrets across different regions of a network. As used herein, a "network", may include one or more service/cloud provider networks (sometimes referred to simply as a "cloud") to span different geographic locations and connect different stand-alone networks. A cloud provider network can be formed as a number of different regions, where a "region" is a separate geographical area in which the cloud provider clusters data centers. A "stand-alone network" may include networks that are external to the service provider network (e.g., at client-owned premises or client-managed data centers) and/or networks that include computing resources allocated within a service provider network on behalf of a user.

Using techniques described herein, a user of a service provider network may utilize a secrets management system (SMS) to configure and manage replication of secrets across different regions of the cloud that are in different geographic regions. According to some examples, the SMS may expose different input mechanisms to replicate secrets across different regions, such as a graphical user interface (GUI), a user interface (UI), a command line interface (CLI), an application programming interface (API), and the like. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

In some configurations, the SMS exposes an API that may be used for the replication of secrets. The user may utilize the API and/or some other input mechanism to manage the replication of secrets across different regions. For example, the user may use an API to create and replicate a secret, replicate an existing secret, remove a secret, stop replicating a secret, change an operation/parameter involving the secret, configure rotation of a secret, obtain information about the secret, or perform some other action or operation. "Rotation" refers to the changing/resetting of a secret. According to some examples, the API may also be used to specify one or more events that are used to specify when to replicate a secret from one region to selected other regions, when to rotate a secret, and/or perform some other operation/action relating to the secret. The events may indicate changes to a secret, an expiration of a time (e.g., change secret according to a schedule, . . . ), and the like.

In some configurations, the SMS may be configured as an event-driven replication service that reads replication messages (e.g., from a message service) to determine when to perform a requested operation relating to a secret. Upon detection of a replication message, the SMS reads the message, identifies the secret, and performs an action/operation involving the secret. For instance, a secret replication service (SRS) within a region may identify an already existing secret identified within the replication message, access the secret within the region, and re-encrypt the secret using a customer-specified key management system (KMS) key using customer credentials (e.g., customer authentication credentials). After the secret is re-encrypted, the secret can be packaged into a new message payload by the SRS which generates a secret replication message that is accessible by a SRS in the specified region(s), which may be referred to herein as "replicated region", where the secret is to be replicated. In some examples, a SRS in each of the replicated regions reads the secret replication message, accesses the secret that was replicated, and saves the secret in the replicated region.

As an illustrative example, a customer may use the SMS to replicate secrets to the regions where the customer operates multi-region applications. According to some configurations, a customer selects an existing secret to replicate and/or creates a new secret to replicate. The customer may then specify the region(s) in which to replicate the secret. For example, the user may specify to replicate the secret from the region the secret is created, which may be referred to herein as the "primary region", to one or more other regions (the "replicated regions"). This allows the customer to access a secret within a region without having to make cross-region calls thereby reducing latency and providing availability to the secret within each region.

As a specific example, a customer may create regional read replicas of database secrets to support cross-region database read replicas set up for disaster recovery or some other purpose. Multi-region secrets simplify automation of infrastructure provisioning process by enabling a customer to create a multi-region secret and its read replicas across the regions with a single API call.

In some examples, the secret and any associated data with the secret is replicated to the specified regions. For instance, metadata such as tags, resource policies and secret updates such as information indicating how the secret is to be rotated can be replicated across the specified regions. The secret name may also be the same across all regions to enable easy discoverability. This helps the customer to easily read secret replicas in the specified regions to meet application needs without managing the complexity of setting up the secrets individually in each region.

Should a customer want to keep specific secrets regional, the customer may set up policy that restricts permissions to the APIs that enable replication. To create a new secret and set it up for replication, the SMS may check whether the customer requesting creation/replication has permission to perform the operation.

According to some configurations, a customer may also specify whether to automatically rotate (e.g., change) the secret according to a schedule (e.g., every 30 days, one month, . . . ). If a customer chooses to automatically rotate the secret, the secret rotation can be performed in the primary region and the new secret value can be propagated to all the replicated secrets. As such, rotation need not be managed individually for all the read replicas in the different regions. Any updates to the secret value or the secret metadata on the primary secret can also be automatically propagated to the replicated secrets. Using the techniques described herein, secrets may be easily replicated across multiple regions while strong security perimeters are maintained to manage access control. Having the ability to configure and manage replication of secrets across different regions helps customers to create/update/maintain secrets.

While the techniques described herein are with reference to replicating secrets across regions, the techniques are equally applicable to replication of secrets to different locations (e.g., from one computer to another). Additionally, while the examples herein discuss utilization of networks provided by a service provider, implementations are not so limited. For example, the techniques provided herein may be operating in other networks, across networks provide by different service providers, and the like.

Certain implementations and examples of the disclosure will now be described more fully below with reference to the accompanying figures, in which various aspects are shown. However, the various aspects may be implemented in many different forms and should not be construed as limited to the implementations set forth herein. The drawings herein are not drawn to scale. Like numerals represent like elements throughout the several figures (which might be referred to herein as a "FIG." or "FIGS.").

FIG. 1 is a software and network architecture diagram 100 showing aspects of cross-region replication of secrets across different regions of a network. It is to be appreciated that the environment 100 is merely illustrative and that the various configurations disclosed herein can be utilized in many different types of computing environments.

To provide functionality disclosed herein, the SMS 102 may include one or more computing resources 120. The computing resources 120 may be provided by a service provider that operates one or more service/cloud provider networks 104 (sometimes referred to simply as a "cloud"), which refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services over a publicly accessible network (e.g., the Internet, a cellular communication network, etc.) and the hardware and software in cloud provider data centers that provide those services.

A cloud provider network can be formed as a number of different regions, where a region is a separate geographical area in which the cloud provider clusters data centers. The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their users or clients. The computing resources 120 implemented by the SMS 102 and executed on behalf of one or more users of the service provider can be data processing resources, such as virtual machine ("VM") instances, data storage resources, networking resources, data communication resources, network services, and other types of resources.

The computing resources 120 utilized can be general-purpose or can be available in a number of specific configurations. For example, data processing resources can be available as physical computers or VM instances in a number of different configurations. The VM instances can be configured to execute applications, including web servers, servers, media servers, database servers, some or all of the network services described above, and/or other types of programs. Data storage resources can include file storage devices, block storage devices, and the like. The SMS 102 can also include and utilize other types of computing resources not mentioned specifically herein.

According to some configurations, servers are utilized to provide at least a portion of the computing resources 120 and execute software components to provide functionality described herein, including functionality related to the replication of secrets across regions. The software components can execute on a single server or in parallel across multiple servers in the SMS 102. In addition, a software component can consist of subcomponents executing on different servers or other computing devices in the SMS 102. Various components can be implemented as software, hardware, or any combination of the two. In this regard, it is to be appreciated that the SMS 102 shown in FIG. 1 has been simplified for discussion purposes and that many additional software and hardware components can be utilized.

A user 138 of the SMS 102 can utilize a computing device 134, or some other input device, to access the SMS 102 through a network 132. The user 138 may be a user/customer of the service provider network 104 that provides computing resources within the service provider network 104. The computing device 134 is an input/output device configured to receive input associated with specifying parameters utilized by the secret replication service (SRS) 110 to manage the replication of secrets across different regions. The computing device 134 may also present for display a user interface 136, that may be utilized by the user 138 to set or view parameters associated with the replication of secrets across different regions, and the like. The user interface 136 may also be utilized by the user as a CLI.

The computing device 134 may be one or more devices, such as but not limited to a smart phone, a smart watch, a personal computer ("PC"), desktop workstation, laptop computer, tablet computer, notebook computer, personal digital assistants ("PDA"), electronic-book reader, game console, set-top box, consumer electronics device, server computer, or any other type of computing device capable of connecting to the network 132 and communicating with the SMS 102.

As illustrated, the computing device 134 may couple with the SMS 102 over a network 132. The network 132 may represent an array or wired networks, wireless networks (e.g., WiFi), or combinations thereof. The SMS 102 may provide a variety of different services (not shown) as a network-accessible platform that is implemented as a computing infrastructure of processors, storage, software, data access, and so forth that is maintained and accessible via the network 132, such as the Internet. These services may not require end-user knowledge of the physical location and configuration of the system that delivers the services. Common expressions associated with these remote services, include "on-demand computing", "software as a service (SaaS)", "platform computing", "network accessible platform", and so forth.

The network 132 can be a local-area network ("LAN"), a wide-area network ("WAN"), the Internet, or any other networking topology known in the art that connects the user devices to the SMS 102. The user 138 can use an application (not shown) executing on computing device 134 to access and utilize the functionality provided by SMS 102. In some examples, the application is a web browser application, such as the Amazon® Silk® web browser, or some other web browser. Generally, a web browser application exchanges data with the computing devices in the SMS 102 using the hypertext transfer protocol ("HTTP") over the network 132.

The application might also be a stand-alone client application configured for communicating with the SMS 102. The client application can also utilize any number of communication methods known in the art to communicate with the SMS 102 across the network 132, including remote procedure calls, SOAP-based web services, remote file access, proprietary client-server architectures, and the like. According to some configurations, the application provides a user interface 136 that can be utilized by the user 138 for the replication of secrets across different regions. The user interface 136 may also be utilized to present data, and/or to interact with the SMS 102.

In some examples, web service users or, in general, clients may utilize or otherwise control a processing entity of the service provider to control, access, or otherwise manage other computing resources. As such, data associated with the processing entity and/or the computing resources of the service provider may be transmitted to or received from computing resources of a client's private network (or other local network) via one or more network connections. As used herein, a processing entity may be a computing resource of the service provider and may include one or more computing devices, such as instantiated virtual machine instances, configured to access data of the distributed computing system (e.g., provided by the distributed system and acting on behalf of a client or user of the system).

In some configurations, the service provider may also provide storage, access, and/or placement of one or more computing resources through a service such as, but not limited to, a web service, a cloud computing service, or other network-based data management service. For example, a user or processing entity acting on behalf of the user may access, via the service provider, data storage services and/or data management services such that access mechanisms may be implemented and/or provided by the service provider to the processing entity utilizing the computing resources. In some examples, computing resource services, such as those provided by the service provider, may include one or more computing resources accessible across one or more networks through user interfaces (UIs), application programming interfaces (APIs), and/or other interfaces where the one or more computing resources may be scalable and/or expandable as desired As briefly discussed above, a user of a service provider network, and/or a component or device, may utilize the SMS 102 to manage the replication of secrets. According to some configurations, the SMS 102 exposes different input mechanisms to manage the replication of secrets, such as a user interface (UI) 136, a command line interface (CLI), API(s) 140, and the like.

As illustrated in FIG. 1, the user 138 may configure a secret to be replicated between different regions, such as between two or more of regions 1-N. As briefly discussed above, the user 138 may utilize a UI 136, API(s) 140, or some other mechanism to manage the replication of secrets. As a particular example, assume that user 138 has utilized UI 136 to specify to create a secret in region 1 and to replicate the secret to region 2. Using the UI 136, the user 138 may create the secret, designate where to replicate the secret and set other parameters relating to the management of the secret (See FIGS. 3A-3E for example GUIs for management of secrets replicated across regions).

In some configurations, each of the regions, such as regions 1-N, include a secret replication service 110, a key management service 112, a message service 114, other service(s) 124, data store 126, and API(s) 140 used for the management of the replication of secrets.

As briefly discussed above, the SMS 102 may be configured as an event-driven service that reads replication messages (e.g., from a message service 114). Upon detection of a replication message, the SMS 102 reads the message (e.g., from a message queue), identifies the secret, and performs an action involving the secret. For instance, a secret replication service (SRS) 110 within a region (e.g., region 1, region 2, . . . ) may identify an already existing secret identified within the replication message from the region, access the secret within the region, and re-encrypt the secret using a customer-specified KMS key using customer credentials (e.g., customer authentication credentials). After the secret is re-encrypted by the SRS 110, the key management service 112, or some other component or device, the secret is packaged into a new message payload by the SRS 110 which generates a secret replication message that is accessible by an SRS 110 in the region(s) where the secret is replicated. The SRS 110 in each of the replicated regions reads this new secret replication message, accesses the secret that was replicated, and saves the secret in the replicated region.

According to some examples, the SMS 102/SRS 110 encrypts a secret to replicate using a default key, and/or a selected key by the customer. For instance, a secret may be encrypted using multi-region secrets using managed keys. Key management refers to management of cryptographic keys in a cryptosystem. This includes dealing with the generation, exchange, storage, use, crypto-shredding (destruction) and replacement of keys. It may include cryptographic protocol design, key servers, user procedures, and other relevant protocols), customer master keys (CMKs), and/or regional/multi-region CMKs. A CMK is a logical representation of a master key that contains the material used to encrypt/decrypt data and may include metadata such a key ID, creation date, description, and key state. A CMK may be symmetric (e.g., a 256-bit key) or asymmetric (e.g., an RSA key pair).

In some configurations, a managed key associated with each of the specified regions can be used to encrypt the secret in each region where the secret is replicated. If some examples, the user specifies the key to use for each region while configuring the secret replication. For example, the customer may use a regional CMK, a multi-region CMK, or some other key to encrypt the secret. The user may also specify a key policy that allows for use by the SMS 102 and is set in all the regions you want the secret to be replicated to before using it to encrypt a secret. A key policy is similar to an Identity and Access Management (IAM) policy and specifies the requirements to be fulfilled before an action is permitted. Access to the CMK may be restricted to specified accounts/users/roles based on a specified policy. In some configurations, a customer may change from a regional CMK to a multi-region CMK by re-encrypting the secret using a multi-region CMK before replicating the secret to other region(s). In addition to cross-region replication, the SMS 102 exposes functionality for the removal of replica secrets and the ability to promote a replica secret to a "standalone" secret in the replicated region, severing the replication relationship from the primary region. The SMS 102 may also expose other functionality relating to managing replication of secrets.

In some configurations, as discussed above, the SMS can use a key management service, regional CMKs or multi-region CMKs, or some other key, to manage encryption of multi-region secrets. This helps to ensure that secrets remain encrypted at rest and in transit for the purpose of replication. The SMS 102 may also replicate the secret along with any associated metadata, so when there is a change to the primary secret, for example through secret rotation or the addition of a tag, these changes are propagated to the secret read replicas in different regions.

According to some configurations, a customer selects an existing secret to replicate and/or creates a new secret to replicate. The customer may then specify the region(s) in which to replicate the secret using UI 136, API(s) 140, or some other input mechanism. For example, the user may specify to replicate the secret from the region the secret is created, which may be referred to herein as the "primary region", to one or more other regions (the "replicated regions").

In some examples, the secret and any associated data with the secret is replicated. For instance, metadata such as tags, resource policies and secret updates such as information indicating how the secret is to be rotated can be replicated across the specified regions. The secret name may also be the same across all regions to enable easy discoverability. This helps the customer to easily read secret replicas in the specified regions to meet application needs without managing the complexity of setting up the secrets individually in each region. Should a customer want to keep specific secrets regional, the customer may set up an IAM policy that restricts permissions to the APIs that enable replication.

According to some examples, the customer may use a GUI to create a new secret and set it up for replication by specifying a list of regions where to replicate the secret. For instance, the user may use the GUI 136 to select regions to replicate the secret or use an API (e.g., CreateSecret) from the primary region. The customer may also replicate an existing secret in one or more regions by using a UI or using the API 140 (e.g., ReplicateSecretToRegions) from the primary region and passing the secret to replicate and the list of regions. The APIs to create a new secret and to replicate an existing secret may also allow the customer to pass pairs consisting of a region and a KMS KeyID to encrypt the secret in that region. If some examples, when a KMS Key is not specified, the primary secret and its replicas are encrypted using a default Managed Key for that region (e.g., one created by the service provider on behalf of the customer).

To create a new secret and set it up for replication, the SMS 102, the SRS 110, or some other component or device, may check whether the customer requesting creation/replication has permission to perform the operation. For instance, the customer may need IAM permission to call the API in the primary region. Additionally, if the customer is using a regional CMK or multi-region CMK to encrypt the secret and its replicas, the customer may need IAM permission to call an API associated with a key management service to create the key in the regions requested to replicate the secret.

To determine the regions where a multi-secret is replicated, a customer may use a GUI and/or use the API (e.g., describeSecret) from the primary region to obtain a list of regions and the replication status for each region. When a call is made to the describeSecret API from a replicated region for a multi-region secret, the primary region for the replica will also be returned.

If the primary secret is set up for rotation, the secret rotation can be executed in the primary region and the new secret value can be propagated to all the associated read replicas. As such, rotation need not be managed individually for all the read replicas in the different regions. Any updates to the secret value or the secret metadata on the primary secret can also be automatically propagated to all the read replicas. Secret read replicas can't be modified independently and all modifications to a replicated secret can only be made in the region the secret was created.

To sever a secret read replica's association with its primary secret and convert it to a standalone secret, a customer can call the API: StopReplicationToReplica from the replicated region. A customer can stop replicating a primary secret to one or more regions by calling the API: RemoveRegionsFromReplication from the primary region. This deletes the replicas from the specified regions and stop replicating the primary secret to those regions. Each replicated secret can be deleted independently from their respective regions by first severing the replica from its primary secret and then deleting it. Alternately, a customer can also delete replicas by calling the API: RemoveRegionsFromReplication from the primary region to delete the replicas from specified regions and stop replicating the primary secret to those regions. The primary secret can be deleted only when all its associated read replicas are deleted or severed.

A customer may encrypt multi-region secrets using Managed Keys, regional CMKs or multi-region CMKs. If a KMSKeyID is not specified while setting up a secret for replication, the Managed Key for the specified regions can be used to encrypt the secret in each region. If a customer wants to use a regional CMK to encrypt secret replicas, the customer may specify the KMSKeyIDs for each region while setting up secret replication. If the customer wants to use a multi-region CMK to encrypt a multi-region secret, the customer can create a multi-region CMK and ensure that the key policy allows for use by the SRS 110 and is set in the regions the customer wants the secret to be replicated to before using it to encrypt a multi-region secret. If the customer wants to update an existing regional secret to replicate it across multiple regions using a multi-region CMK, the customer may first re-encrypt the secret using a multi-region CMK before replicating the secret. This can be done by calling the UpdateSecret API and passing the KMS Key ID of the multi-region CMK.

A multi-region secret may be made regional by severing all the replicas from the primary secret. For instance, one of the replicated secrets may be moved to a stand-alone primary secret. In some examples, a StopReplicationToReplica API may be used. To set up the new standalone secret for rotation, the secret is updated to include the endpoint information of the newly promoted stand-alone database.

A customer may also manage access control for multi-regions secrets. In some configurations, IAM based policies can be used. Each replicated secret is a unique entity with its own resource name. A customer can set up IAM policies on each secret to control access as required to meet access control needs. For example, a customer can meet regional data access requirements by providing user A access to a replicated secret exclusively in region A and user B access to the secret exclusively in region B.

IAM context keys such as PrimarySecretRegion may be used to write IAM policies that allow retrieving a secret only if the primary region associated with the request is restricted to a specific region, thereby enabling the customer to meet security requirements around always maintaining the primary secrets in a specific region. While replicating a secret, the resource-based policy is also replicated, and you can use it to control access such that an IAM principal has access to the secret across all regions or provide different principals access to the secret in different regions. Replicating a secret may also replicate the associated tags in some configurations. This simplifies permission management on secrets by setting up tag-based access control through a single IAM policy that grants access to the replicated secrets in multiple regions.

As described, a customer of a service provider network may easily replicate secrets may be easily replicated across multiple regions while strong security perimeters are maintained to manage access control. Having the ability to configure and manage replication of secrets across different regions helps customers to create/update/maintain secrets. Additional details regarding the various components and processes described briefly above for management of the replication of secretes across different regions will be provided below with regard to FIGS. 2-12.

Figure 2:
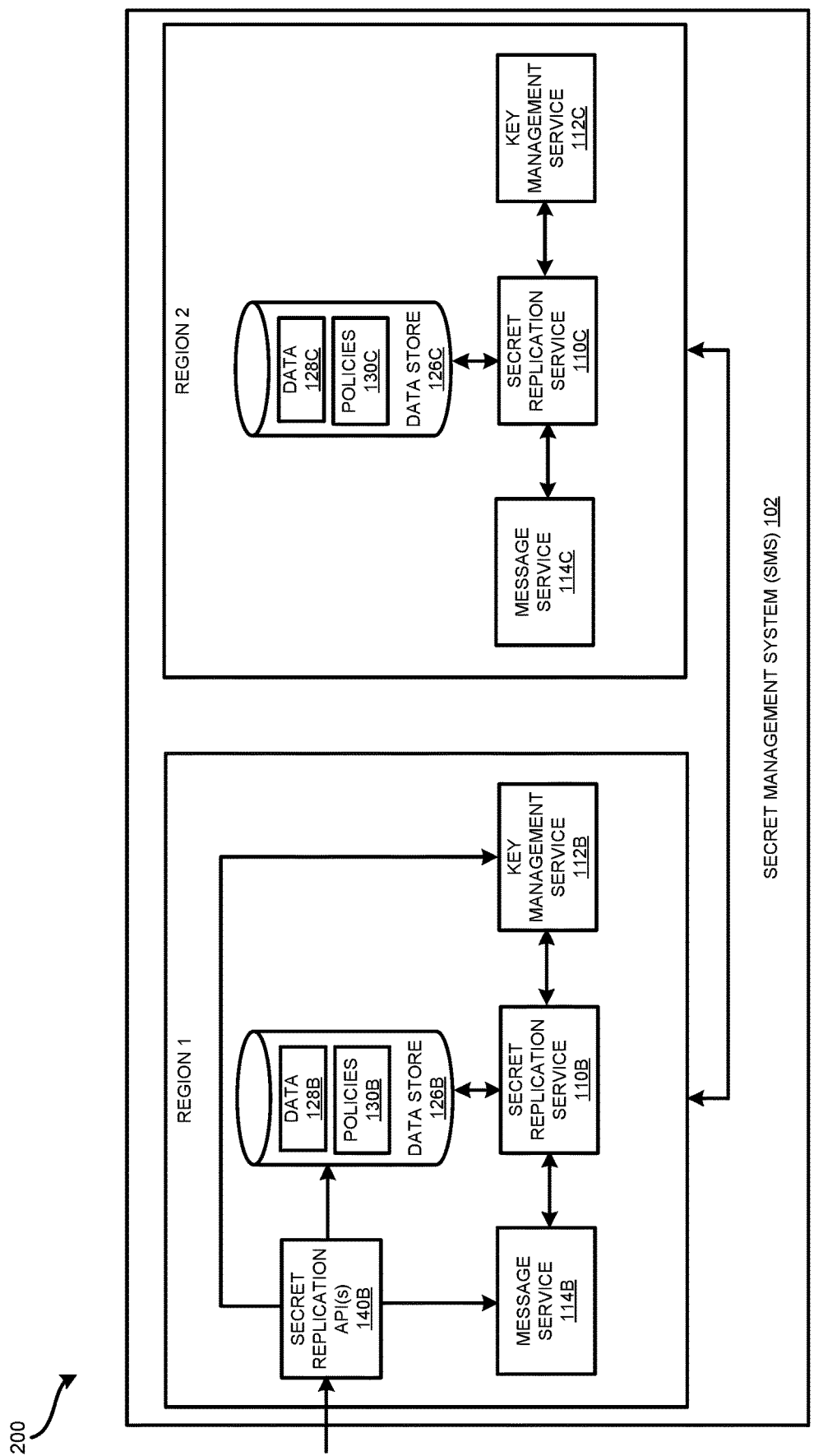
FIG. 2 is a software and network architecture diagram showing aspects of replicating a secret from one region to another region.

FIG. 2 is a software and network architecture diagram showing aspects of replicating a secret from one region to another region. In the example illustrated by FIG. 2, a secret is replicated from region 1 to region 2.

As discussed above, SMS 102 enables customers to easily rotate, manage, and retrieve database credentials, API keys, and other secrets throughout their lifecycle. Instead of being limited to managing secrets in each of the regions, a customer may manage and replicate secrets across different regions.

As illustrated, API(s) 140 receive different data for the management of the replication across different regions. In some configurations, the API(s) 140 expose functionality for creating secrets, replicating secrets, replicating metadata associated with a secret to different regions, deleting secrets, describing secrets, listing secrets, listing secret versions, managing resource policies, remove replicated regions, stopping replication, rotating secrets, tagging a resource, untagging a resource, updating a secret, updating a version of a secret, and the like.

For instance, the create secret API may be used to create a secret in the specified regions. The API may also receive what key(s) to use for encryption/decryption, rotation, and the like. The delete secret API may be used to remove a secret from one or more regions. The replicating secret API may be used to replicate an existing secret to another secret. The describing secrets API may be used to obtain the replication status (e.g., pending, success, fail) for each of the identified regions, as well as other data about the secret. The replicating metadata associated with a secret to different regions API may be used to replicate metadata associated with a secret to other regions. In some examples, the listing secrets allows filtering by primary region, primary secrets, and replica secrets. The listing secret versions API may be used to obtain information about different versions of a secret.

In some examples, the SRS 110 may process different types of messages, such as a trigger replication message, a trigger remove replication message, a trigger orphan secret message, a replication message, a status message, a remove replication message, an orphan secret message, an update last access message, as well as other types of messages.

The trigger replication message may include a secret name, a force overwrite option, encrypted customer authentication credentials, target regions, version number, and a list of secret versions. This message is used to signal a replication from another region. The replication service validates that the version number in the message matches the latest replication version in the secret metadata. If it does not match, this message is discarded due to being stale. Next, the SRS 110 will decrypt the customer authentication credentials using the service CMK that was used to encrypt the credentials. The SRS 110 will then read each secret version, re-encrypt using the customer authentication credentials, serialize the payload, and send one ReplicationMessage per secret version to the message service (or place in a queue) in each target region. Finally, if the version number validation above succeeded, the SRS 110 will serialize the metadata and send a ReplicationMessage to each target region for the metadata.

The replication message is used to signal a replication from another region. The first step is to check the secret metadata for this secret. If it does not exist, a "dummy" metadata object may be created with the primary region and version number to reserve the name. If it exists, ensure the primary region (extracted from the name) matches the region in the message. If force overwrite in the message is true, the validation will check to make sure the existing secret is not a replica of a different region or a primary secret with replicated regions. If validation fails (this can happen if the secret was orphaned or if the secret with the same name already exists in region), a failure StatusMessage may be sent to the primary region. Next, check the type of this message. If it is for a metadata type, validate the version number is greater than or equal to the current version number in the metadata. If not, log a warning and discard the message. Also, if it is a metadata type, validate that all of the listed secret versions exist. If not, place the message back on the queue to be processed later. If the validations pass, replicate the secret version/metadata. If metadata was replicated, send a success StatusMessage to the replication SQS queue in the primary region.

The remove replication message may be used to remove all secret data from a replicated region. The first validation is to make sure the primary region (extracted from the secret name) matches the secret metadata table. If not, discard this message. Next, validation is to check the version number against the version in the secret metadata table. If the version in the metadata table is greater than the version in the message, do not process this message. This is to help ensure data in the instance is not deleted where replication has been added back. After validation, perform the removal by deleting all version is the "List of secret versions" followed by the removal of the metadata. In some examples, streams may be used during the replication process.

FIGS. 3A-3E are diagrams showing exemplary graphical user interfaces for the management of the replication of secrets across regions. In some examples, the user manages the replication of secrets a using a graphical user interface (GUI). In other examples, the user may use a command line interface, or utilize an Application Programming Interface (API). FIGS. 3A, 3B, 3C, 3D, and 3E illustrate example graphical user interfaces 300, 310, 320, 330, and 340 where the user 138 can interact with the secret management system 102. In some instances, the SMS 102 may provide data for displaying a GUI to a display associated with the user computing device 138.

Figure 3A:
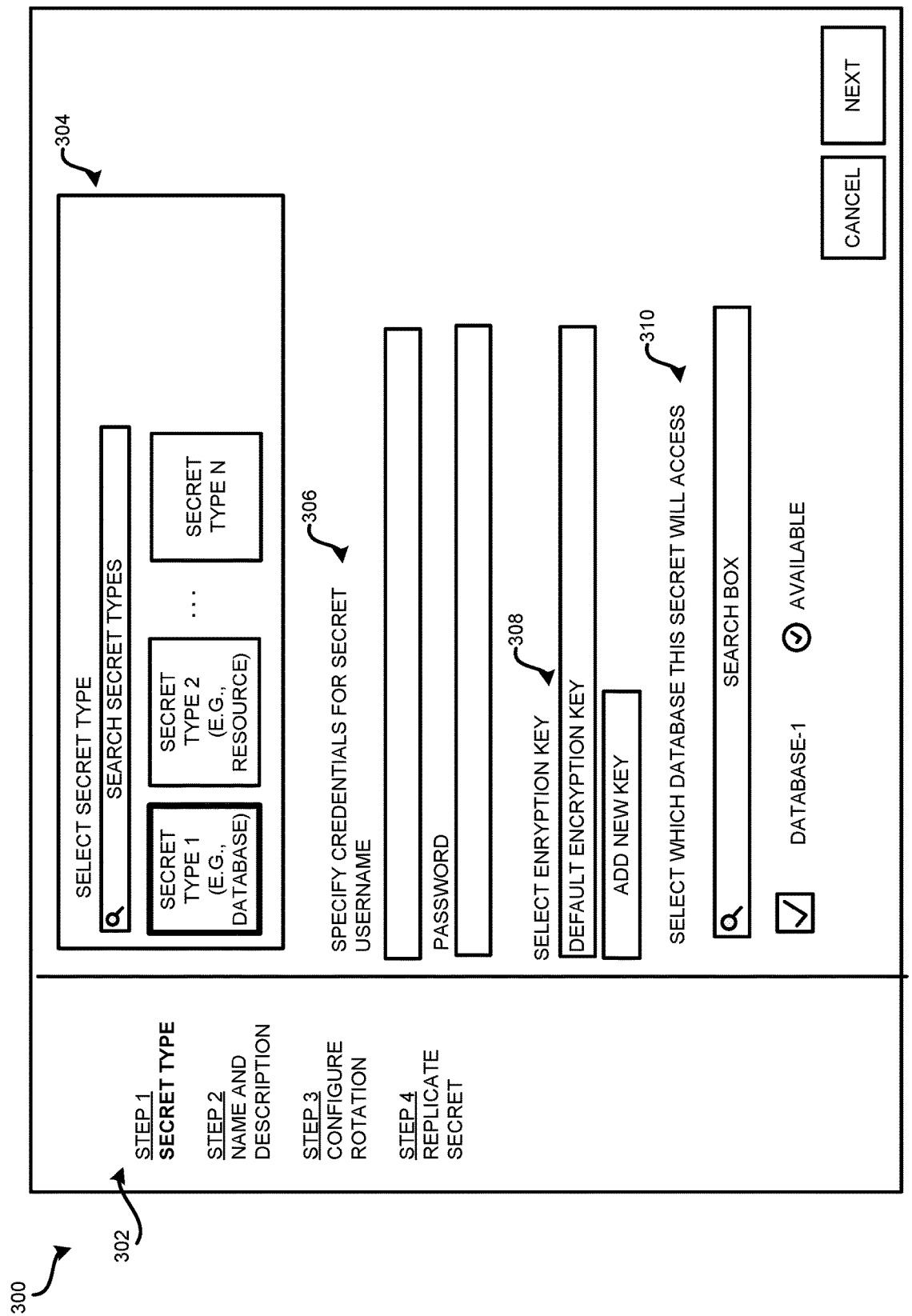
FIG. 3A is a diagram showing an exemplary graphical user interface for creating a secret for replication across different regions of a network.

In the example illustrated in FIG. 3A, GUI 300 shows user interface (UI) elements for selecting a secret type. More or fewer UI elements may be included within GUI 300. As illustrated, GUI 300 includes step UI elements that can be used to select different options relating to configuring the replication of secrets, select secret type UI elements 304, credentials UI elements 306, encryption key UI elements 308, and resource UI elements 310.

In the current example of FIG. 3A, a user has selected the "STEP 1" UI element 302 as indicated by the bold text "SECRET TYPE". According to some configurations, the user may specify the type of secret using the select secret type UI elements 304. As discussed above, the secret may be used for many different resources/purposes. In the current example, the GUI 300 shows N secret types including, but not limited to a secret type 1 for accessing data such as a database, a secret type 2 for accessing some other resource, and the like. In the current example, the user has selected a secret to access a database as indicated by the thicker line around the "secret type 1" UI element. After selecting the secret type, the user may use the credentials UI elements 306 to specify the credentials for the secret, such as a username and password. The encryption key UI elements 308 can be used to specify the encryption key used to encrypt/decrypt data associated with the secret. The resource UI elements 310 can be used to select the associated resource(s) to which the secret applies. In the current example, the secret will be used to access DATABASE-1.

Figure 3B:
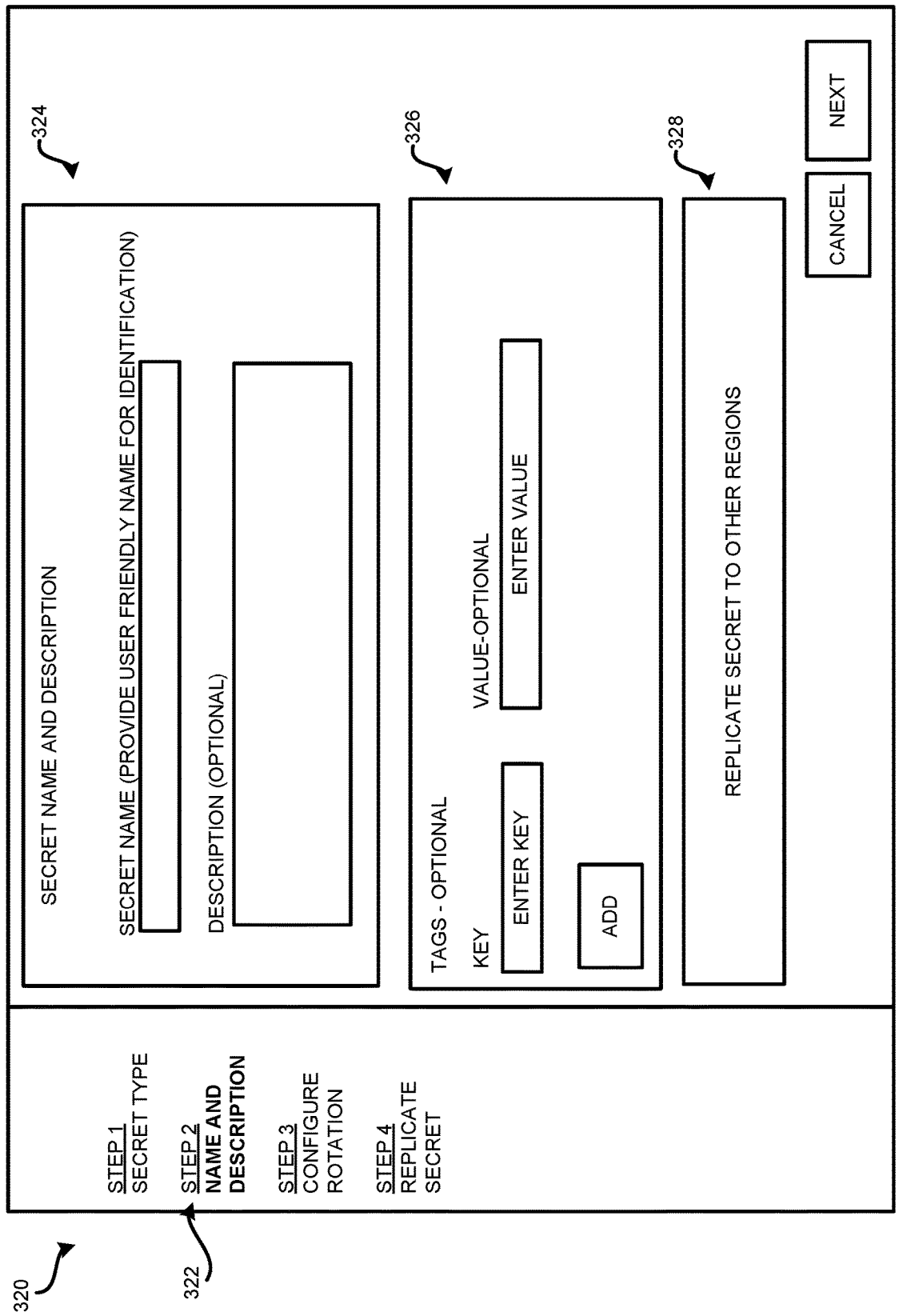
FIG. 3B is a diagram showing an exemplary graphical user interface for specifying information about a secret for replication across different regions of a network.

FIG. 3B shows GUI 320 that includes user interface (UI) elements for specifying the secret name and description. More or fewer UI elements may be included within GUI 320. In the example illustrated in FIG. 3B, GUI 320 shows user interface (UI) elements for selecting a secret type. More or fewer UI elements may be included within GUI 320. As illustrated, GUI 320 includes step UI elements, including step 2 UI element 322, that can be used to select different options relating to configuring the replication of secrets, select secret name and description UI elements 324, tags UI elements 326, and replicate secret UI element 328.

In the example of FIG. 3B, a user has selected the "STEP 2" UI element 322 to provide a name and description of the secret. According to some configurations, the user may specify a user-friendly secret name and description using the secret name and description UI elements 324. The tags UI elements 326 may be used to specify one or more tags/values for a secret. The replicate secret UI element 328, when selected, identifies the secret to be replicated to one or more other regions.

Figure 3C:
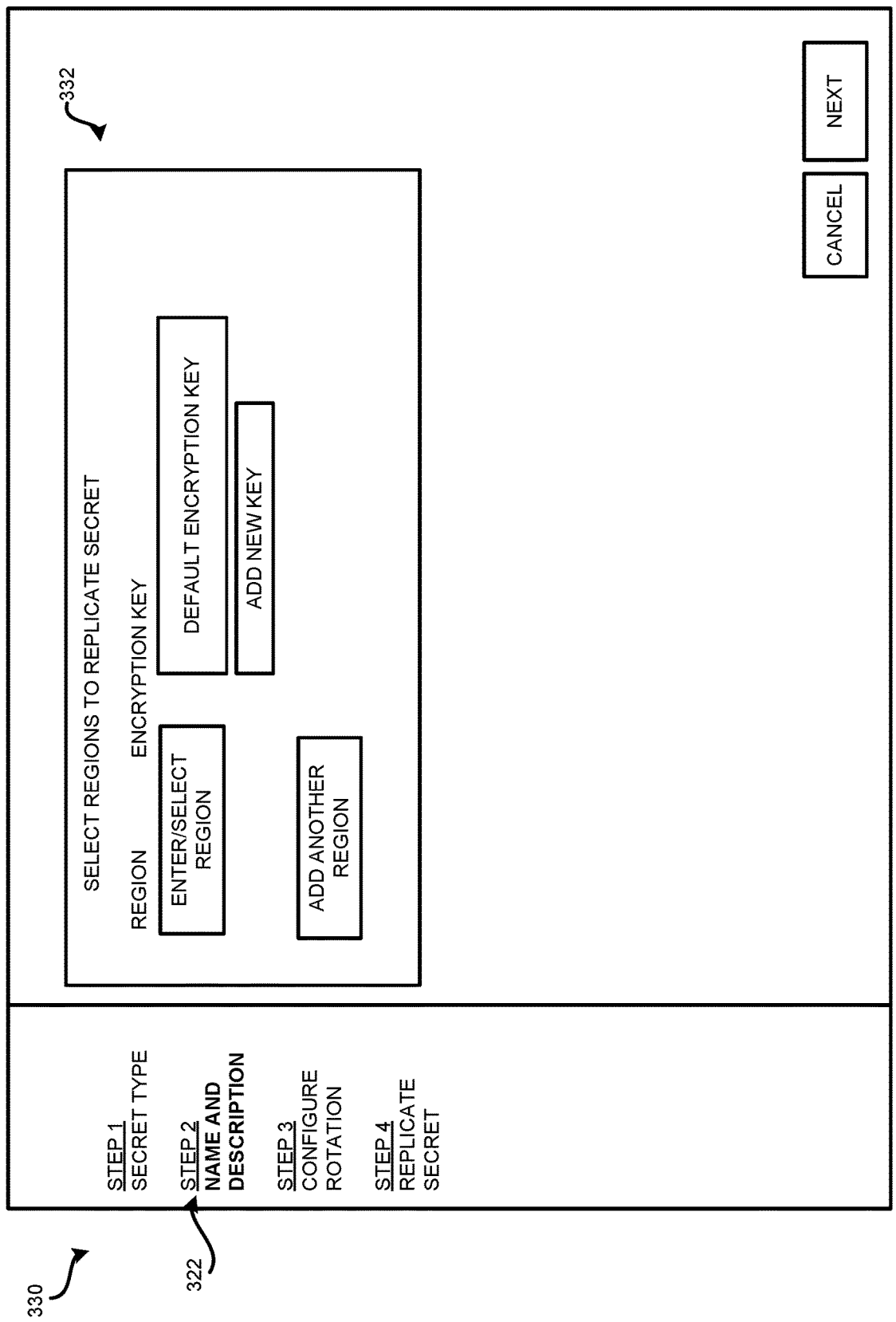
FIG. 3C is a diagram showing an exemplary graphical user interface for identifying regions in which to replicate a secret.

FIG. 3C shows GUI 330 that includes user interface (UI) elements for selecting regions where to replicate the secret. More or fewer UI elements may be included within GUI 330. In the example illustrated in FIG. 3C, GUI 330 shows select regions user interface (UI) elements 332 for specifying the regions. More or fewer UI elements may be included within GUI 330. In the example of FIG. 3C, the user may use select regions UI elements 332 for entering/selecting region(s), setting an encryption key to be used for the regions, adding additional regions, adding other regions, and the like.

Figure 3D:
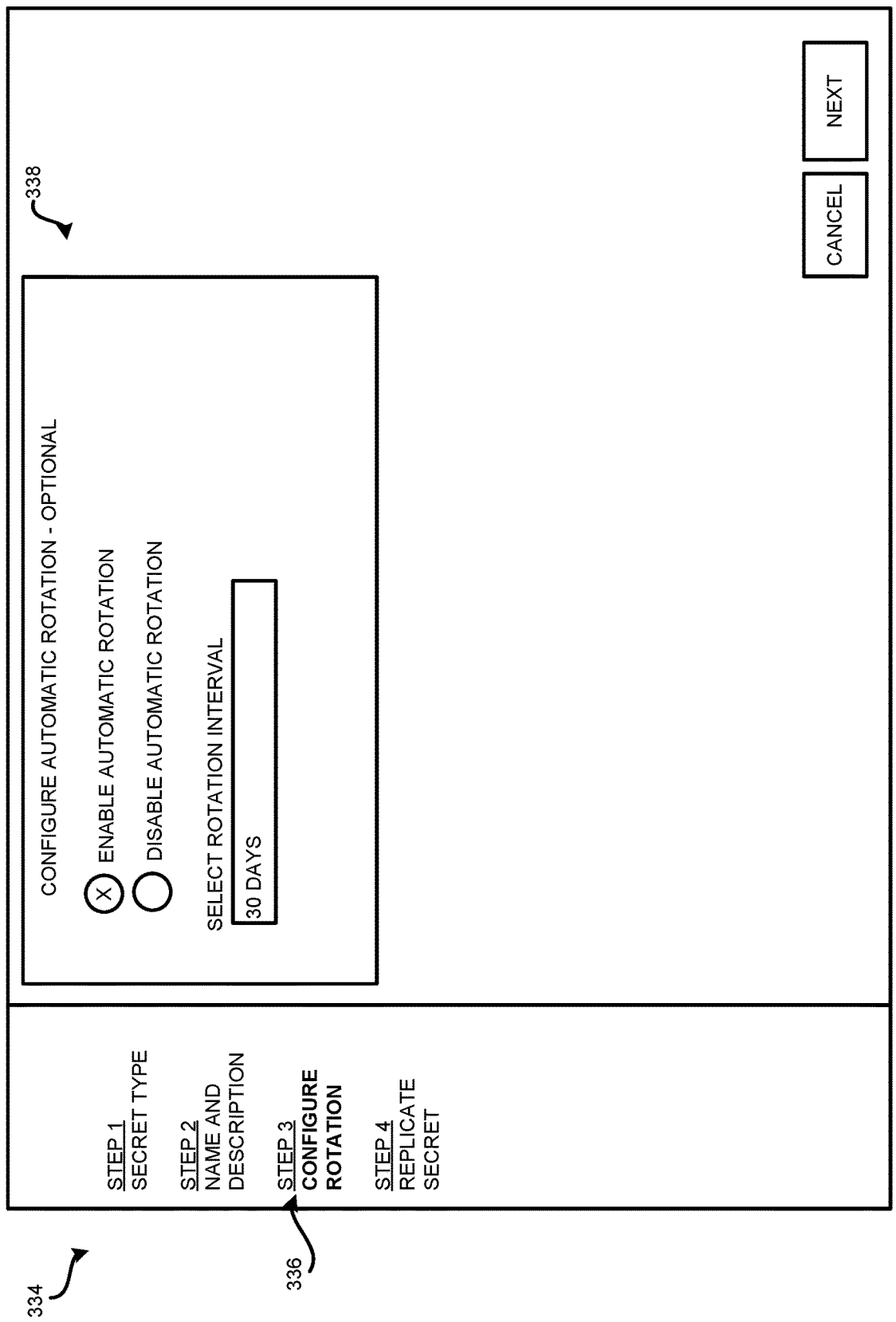
FIG. 3D is a diagram showing an exemplary graphical user interface for configuring automatic rotation for a secret that has been replicated across different regions of a network.

FIG. 3D shows GUI 334 that includes user interface (UI) elements for configuring automatic rotation for a secret. More or fewer UI elements may be included within GUI 334. In the example illustrated in FIG. 3D, GUI 334 shows that the user has selected step 3 UI element 336 to configure the rotation of the secret. More or fewer UI elements may be included within GUI 334. In the example of FIG. 3D, the user may use the rotation UI elements 338 for specifying whether to automatically rotate the secret, and a rotation interval that specifies when to automate the secret (e.g., 30 days, 7 days, . . . ).

Figure 3E:
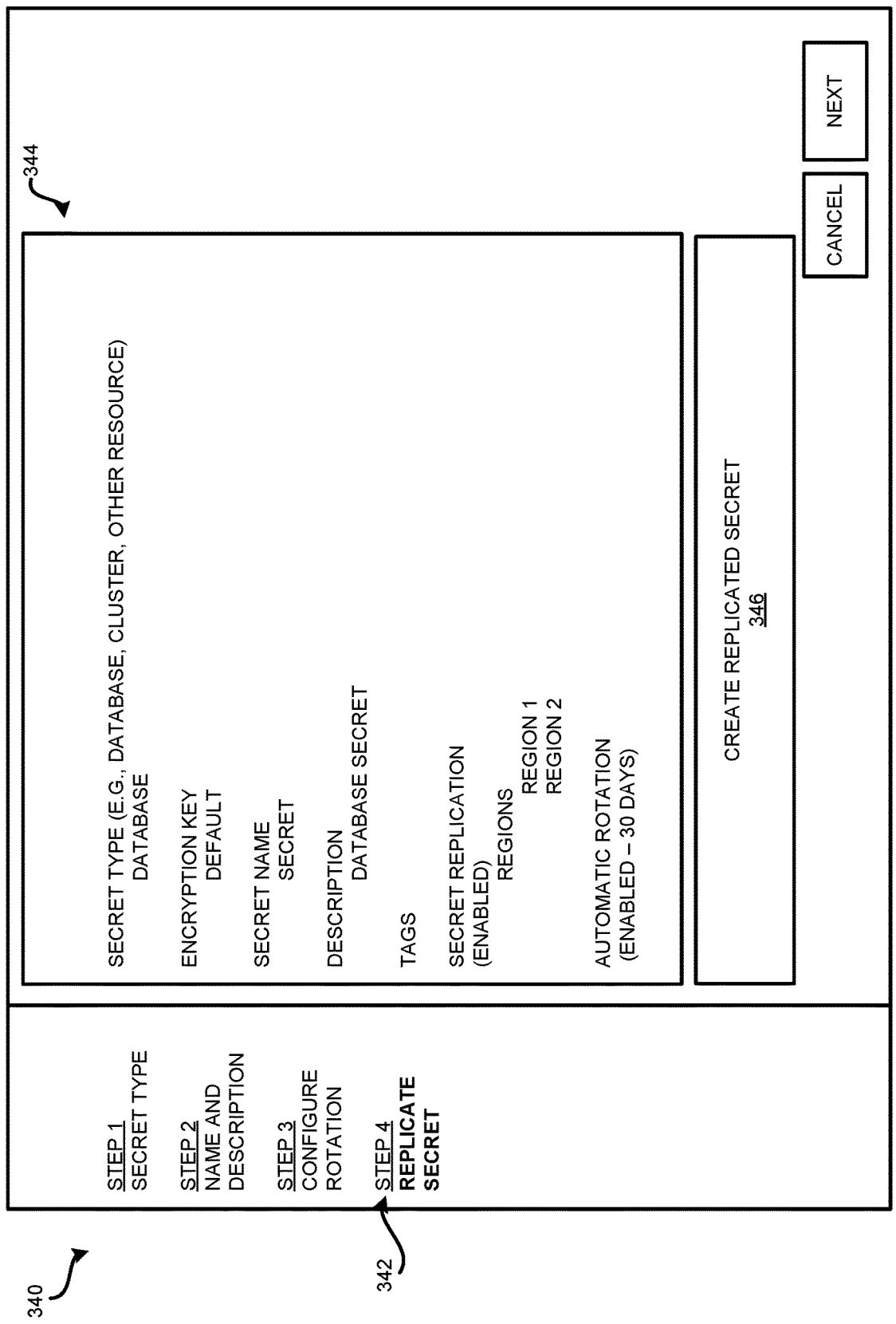
FIG. 3E is a diagram showing an exemplary graphical user interface for reviewing and creating a secret for replication across different regions of a network.

FIG. 3E shows GUI 340 that includes user interface (UI) elements for reviewing and replicating a secret. More or fewer UI elements may be included within GUI 340.

In the example illustrated in FIG. 3E, GUI 340 shows information about the secret that may be replicated to other regions. In the example of FIG. 3E, review UI elements 344 displays information that has been configured for a secret, such as but not limited to the secret type, the encryption key(s) to use, the secret name, a description of the secret, the region(s) where to replicate the secret, and whether or not automatic rotation of the secret is enabled. The create replicated secret UI element 346, when selected, causes actions to be performed to create the replicated secret in the specified regions.

FIGS. 4-9 are flow diagrams showing illustrative routines 400, 500, 600, 700, 800, and 900 for management of the replication of secrets, according to examples disclosed herein. It should be appreciated that the logical operations described herein with respect to FIG. 4, FIG. 5, FIG. 6, FIG. 7, FIG. 8, FIG. 9, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

Figure 4:
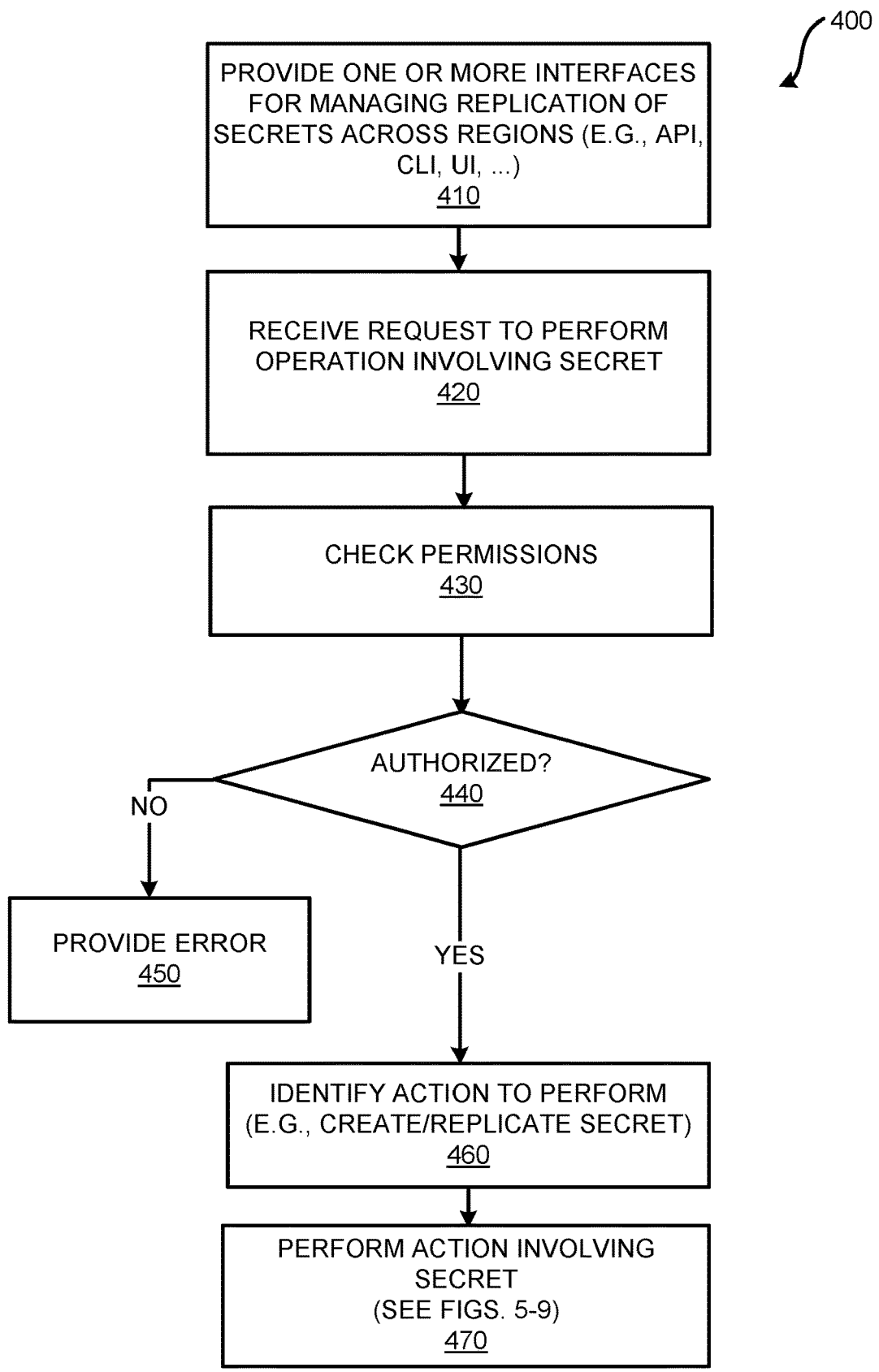
FIG. 4 is a flow diagram showing an illustrative routine for cross-region replication of secrets across different regions of a network.

FIG. 4 is a flow diagram showing an illustrative routine 400 for cross-region replication of secrets across different regions of a network, according to some examples. The routine 400 may be performed by computing resources 120 associated with the SMS 102 and/or other computing resources, such as computing resources associated with some other network or system.

At 410, one or more interfaces are provided for management of the replication of secrets across regions. As discussed above, the SMS 102 may expose one or more API(s) 140, a CLI, and/or a UI 136, such as a graphical user interface. A user, such as user 138, may utilize the interfaces to manage the replication of secrets across regions.

At 420, a request is received to perform an operation relating to the replication of secrets across regions. For example, the request may be to create and replicate a secret, replicate an existing secret, remove a secret, stop replicating a secret, change an operation/parameter involving the secret, or perform some other action or operation. As discussed above, the request may be received from a user, such as user 138 of a service provider network 104. In some examples, a SRS 130 within SMS 102 receives the request.

At 430 permissions are checked. As discussed above, the SMS 102 may prevent unauthorized access to the functionality of the SMS 102. At 440, a determination is made as to whether the request is authorized. When the request is authorized, the routine 400 moves to 460. When the request is not authorized, the routine moves to 450 where an error is generated/provided, and the request is denied.

At 460, the action to perform is identified. As discussed above, the action may be to create and replicate a secret, replicate an existing secret, stop a secret from being replicated, obtain information about a secret, change rotation options for a secret, and the like.

At 470, the action involving the secret is performed. As discussed above, many different operations may be performed. See FIGS. 5-9.

Figure 5:
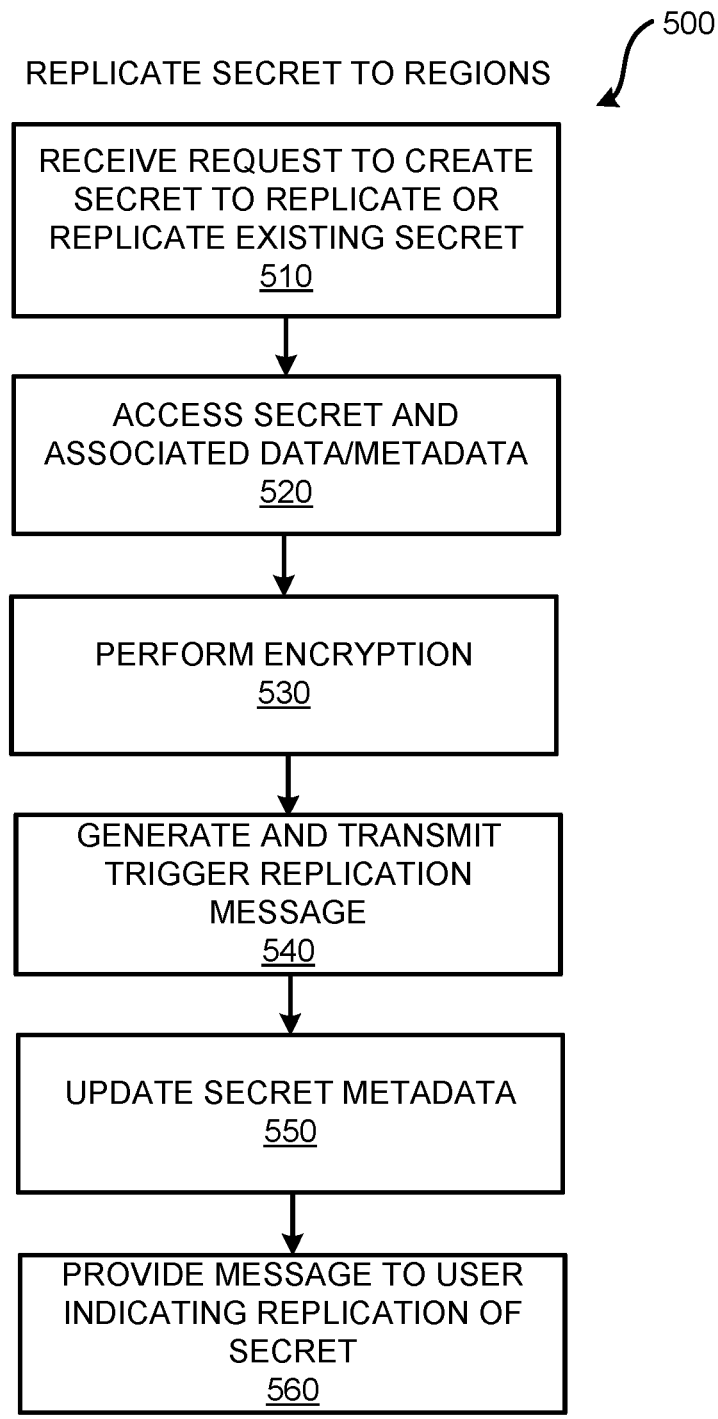
FIG. 5 is a flow diagram showing an illustrative routine for replicating a secret to regions.

FIG. 5 is a flow diagram showing an illustrative routine 500 replicating a secret to different regions. The routine 500 may be performed by computing resources 120 associated with the SMS 102 and/or other computing resources.

At 510, a request is received to create or replicate a secret. As discussed above, the user 138 may utilize an API 140, a CLI, or a UI 136 to request a secret to be created and replicated and/or replicate an existing secret. In some configurations, the SRS 110 of a region receives the request. As an example, the user 138 calls a ReplicateSecretToRegions API or CreateSecret API with a list of regions to replicate the secret.

At 520, the secret and associated data/metadata is accessed. As discussed above, the SRS 110 may use an API to read the metadata for a secret (e.g., from a data store 126) and the any versions of the secret.

At 530, encryption is performed. As discussed above, the SRS 110, or some other device or component, may encrypt the secret and/or other data using a KMS using a CMK.

At 540, a trigger replication message is generated and transmitted. As discussed above, the SRS 110, or some other device or component, may generate and transmit the trigger replication message. In some examples, a message service receives the message and places the message into a queue or some other storage for access by the SRS 110.

At 550, the secret metadata is updated. The secret metadata may be updated to include the correct latest_replication_version as well as the updated replicated_regions, which adds the specified regions along with the status code: PENDING.

At 560, a message is provided to the user indicating the replication of the secret. As discussed above, the SRS 110 may provide a message using a GUI, using an electronic message, or using some other mechanism.

Figure 6:
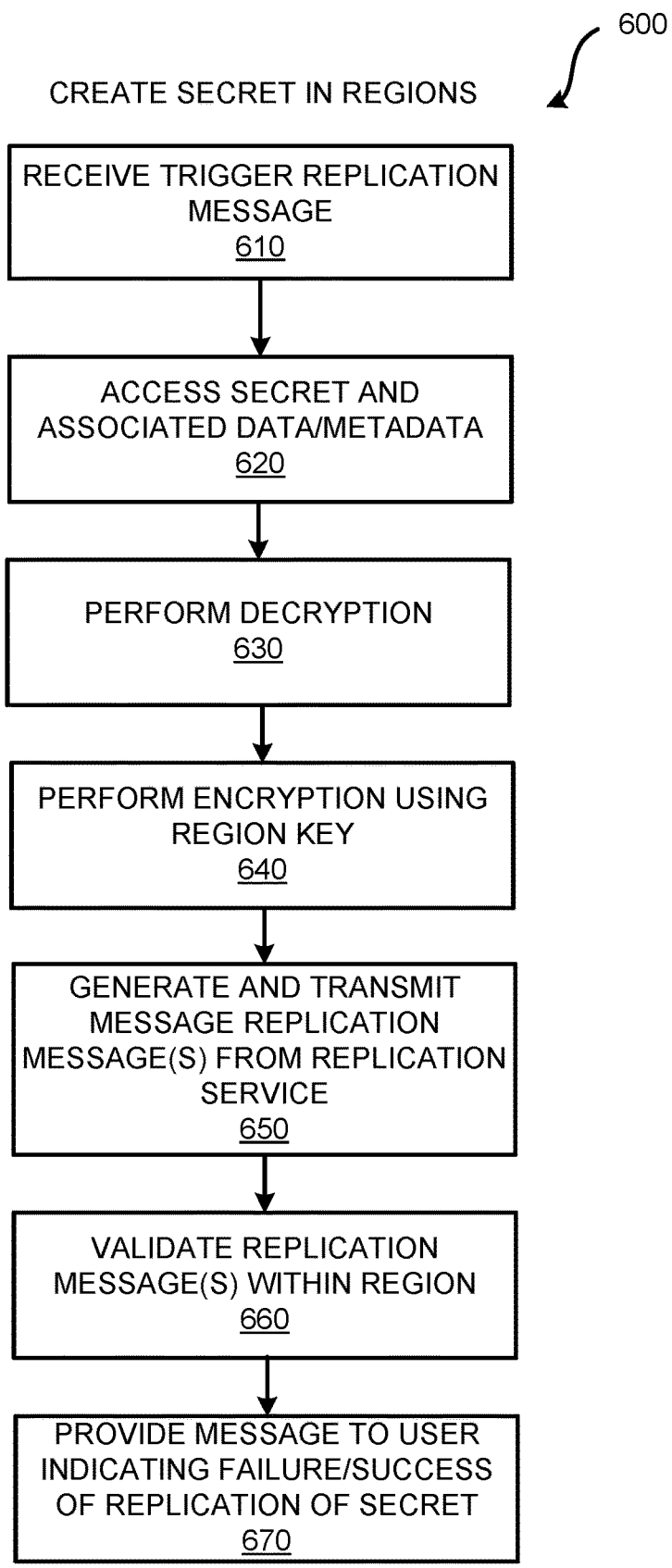
FIG. 6 is a flow diagram showing an illustrative routine for creating a replicated secret in a region.

FIG. 6 is a flow diagram showing an illustrative routine 600 for creating a replicated secret in a region, according to some examples. The routine 600 may be performed by computing resources 120 associated with the SMS 102 and/or other computing resources.

At 610, the trigger replication message is received. As discussed above, the SRS 110 in the region in which the request to replicate the secret may receive the request. According to some examples, the SRS 110 receives an indication that a trigger message has been placed into a message queue associated with management of a secret.

At 620, the secret and secret metadata is accessed. As discussed above, the SRS 110 may access the secret and associated data/metadata. In some examples, the SRS 110 accesses the secrete from a database, or some other data store 126, along with any associated data/metadata that is associated with the secret.

At 630, decryption is performed. As discussed above the SRS 110 may first decrypt the customer authentication credentials included in the TriggerReplicationMessage. This may be done using a KMS decrypt call. For each secret version, the decrypted customer authentication credentials may be used to decrypt the data.

At 640, encryption is performed using a region key. As discussed above, the SRS 110 may re-encrypt the data using a KMS key associated with the region where the secret is replicated.

At 650, a replication message/data is generated and transmitted. As discussed above, the SRS 110, or some other device or component, may generate and transmit the data to the replicate region. In some examples, a message service receives the message(s) and places the message/data into a queue or some other storage for access by the SRS 110 of that region.

At 660, the replication message(s) are validated within the region where the secret is replicated. As discussed above, the SRS 110 may validate the messages (e.g. determine authorizations).

At 670, a message is provided indicating the failure/success of the replication of the secret. As discussed above, the SRS 110 may send a message to the message service for storage in a queue and/or provided to the user. The SRS 110 of the region receiving the request may use this to update the status of the replication in one or more data stores.

Figure 7:
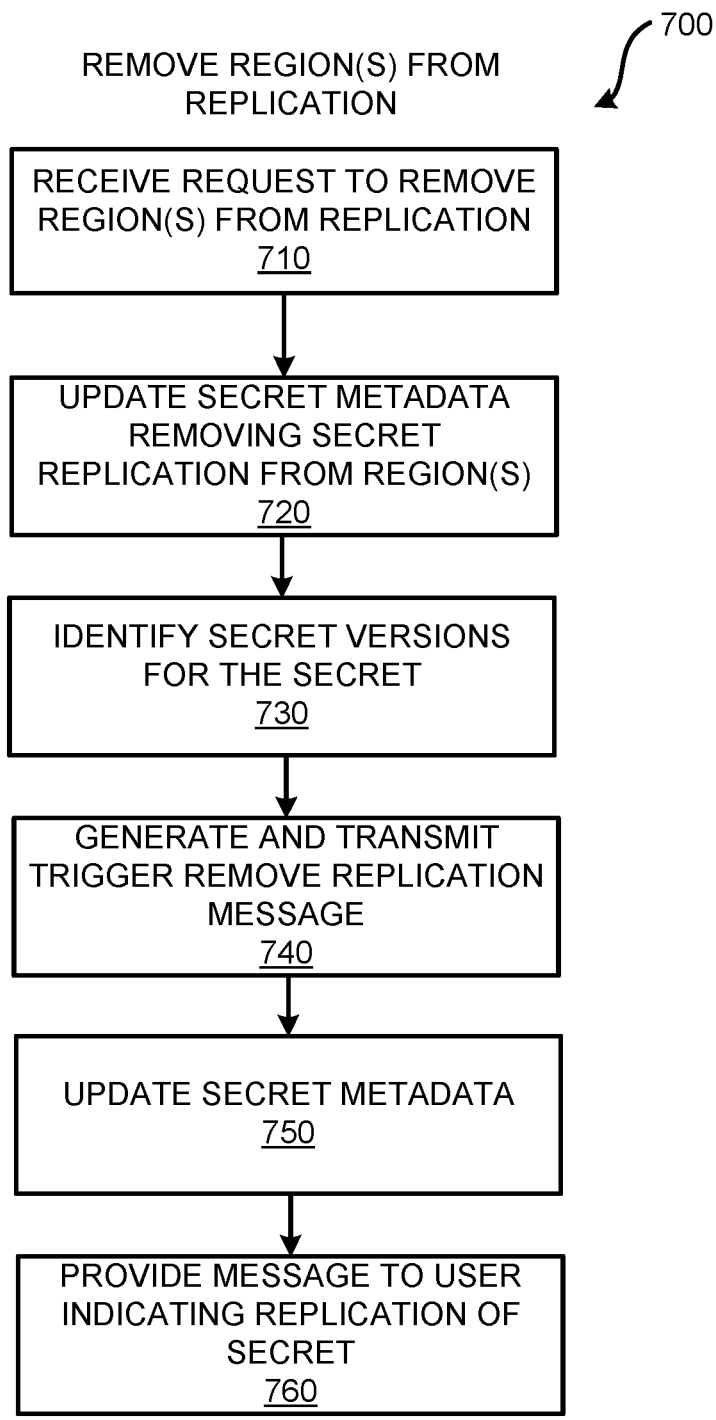
FIG. 7 is a flow diagram showing an illustrative routine for cross-region replication of secrets across different regions of a network.

FIG. 7 is a flow diagram showing an illustrative routine 700 for removing regions from replication, according to some examples. The routine 700 may be performed by computing resources 120 associated with the SMS 102 and/or other computing resources.

At 710, a request is received to remove a region from replication. As discussed above, the SRS 110 may receive the request to remove one or more regions from replication. In some configurations, a user may specify to remove a region from replication using a GUI, the API 140, and/or using some other mechanism.

At 720, the secret metadata is updated to remove the secret replication from the identified regions. As discussed above, in some examples, the SRS 110 in the region in which the replication is requested to be stopped removes the replication. The SRS 110 in the primary region, can also remove the reference to the regions from a data store.

At 730, secret versions for the secret are identified. The SRS 110 may read the secret metadata and generate a list of secret versions for the secret. At 740, the SRS 110 may send a trigger remove replication message to the message service for access by the SRS 110 in the other region(s).

At 750, the secret metadata is updated. The SRS 110 or some other device or component may remove the data from the data store in the region.

Figure 8:
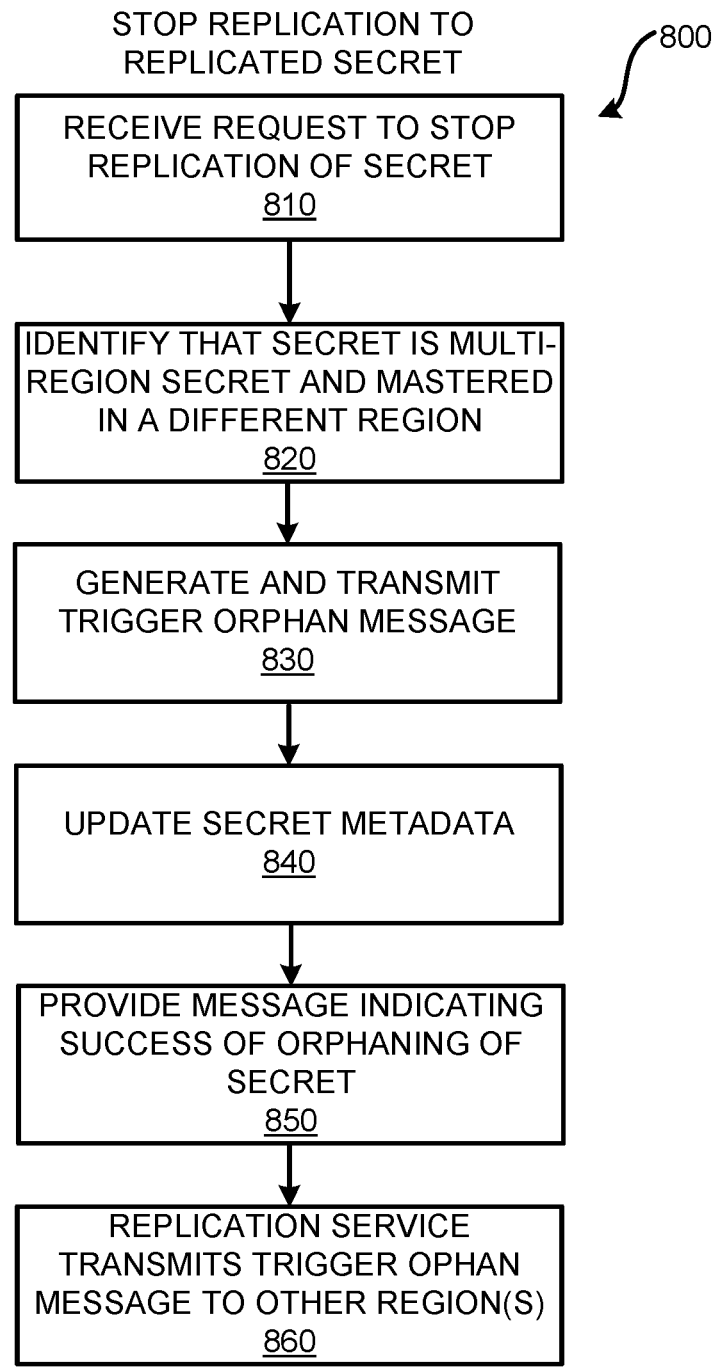
FIG. 8 is a flow diagram showing an illustrative routine for cross-region replication of secrets across different regions of a network.

FIG. 8 is a flow diagram showing an illustrative routine 800 for stopping replication of a replicated secret, according to some examples. The routine 800 may be performed by computing resources 120 associated with the SMS 102 and/or other computing resources.

At 810, a request is received to stop replication of a replicated secret. As discussed above, the SRS 110 may receive the request to remove one or more regions from replication.

At 820, the secret is identified as a multi-region secret and the master is in a different region. The SRS 110 may Service read secret metadata in order to validate that the secret is a multi-region secret and currently mastered in another region.

At 830, a trigger orphan message is generated and transmitted. For example, the SRS 110 may send a TriggerOrphanSecretMessage to an in-region replication queue (e.g., via a message service) with secret identifying information.

At 840, the secret metadata is updated. As discussed above, in some examples the SRS 110 updates the secret metadata to remove the primary region attribute.

At 850, a message is provided indicating success of orphaning of the secret. In some examples, the SRS 110 provides a success message to the user indicating that the secret has been successfully orphaned.

At 860, the replication service transmits trigger orphan message to other regions. As discussed above, SRS 110 may transmit a trigger orphan message to each of the other regions in which to orphan the secret.

Figure 9:
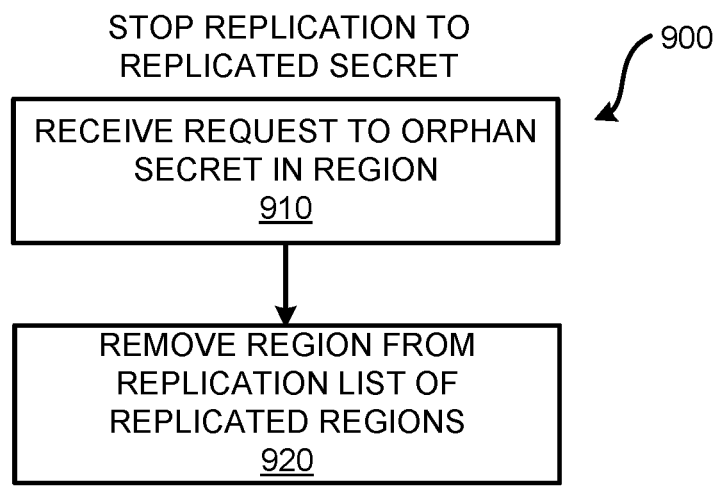
FIG. 9 is a flow diagram showing an illustrative routine for cross-region replication of secrets across different regions of a network.

FIG. 9 is a flow diagram showing an illustrative routine 900 for stopping replication of a replicated secret, according to some examples. The routine 900 may be performed by computing resources 120 associated with the SMS 102 and/or other computing resources.

At 910, a request is received to stop replication of a replicated secret. As discussed above, the SRS 110 within the regions may receive the request via the message service to remove one or more regions from replication.

At 920, the region is removed from the replication list of the replicated regions. As discussed above, the SRS 110 may remove the region from the selected regions in which to replicate the secret.

Figure 10:
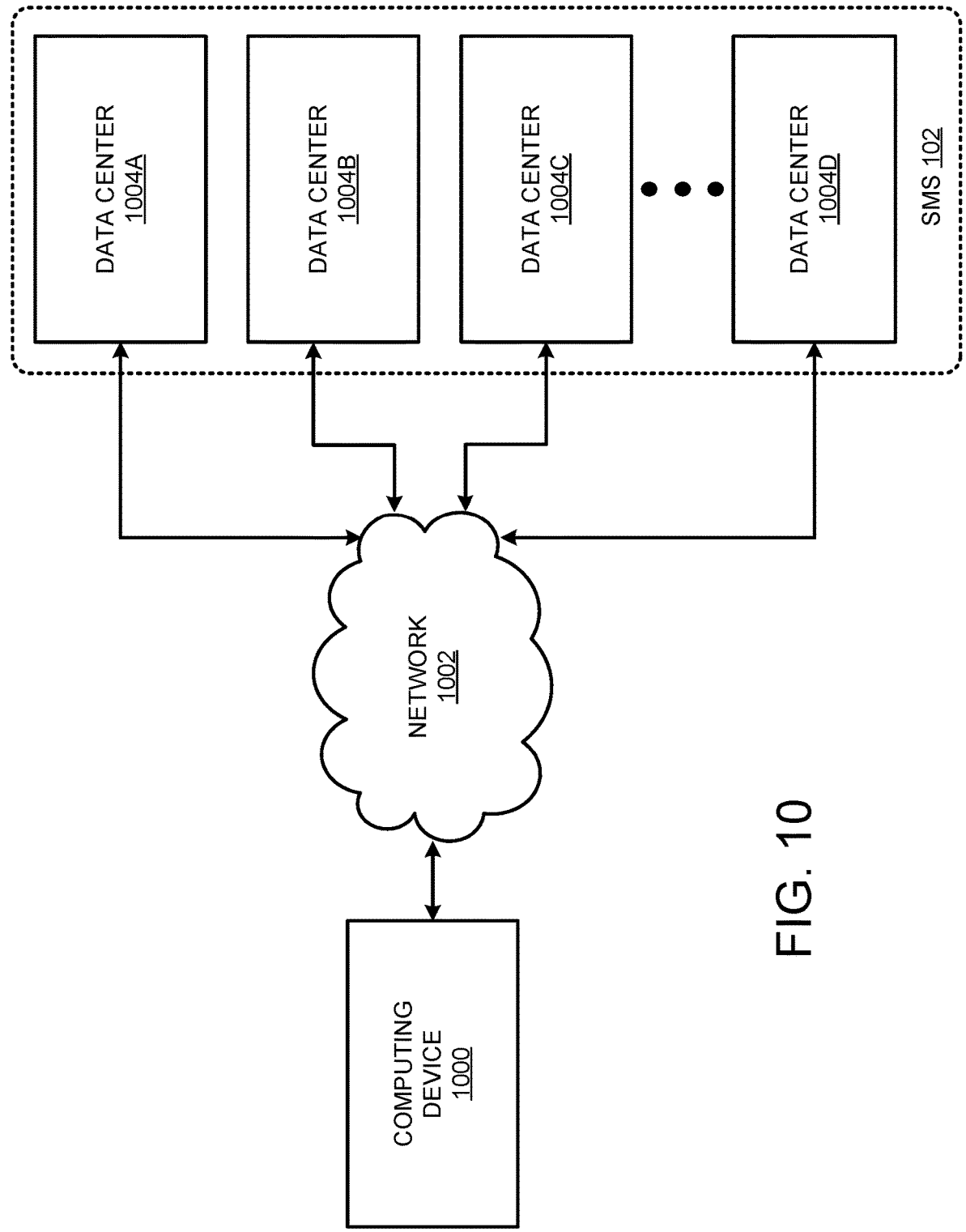
FIG. 10 is a system and network diagram that shows an illustrative operating environment including several data centers that can be configured to implement aspects of the functionality described herein.

FIG. 10 is a system and network diagram that shows one illustrative operating environment for the configurations disclosed herein that includes an SMS 102 that can be configured to provide the functionality described above. As discussed above, the SMS 102 can execute network services that provide computing resources for implementing the functionality disclosed herein. The computing resources implemented by the SMS 102 can be data processing resources, such as virtual machine ("VM") instances, data storage resources, networking resources, data communication resources, network services, and other types of resources.

The computing resources utilized can be general-purpose or can be available in a number of specific configurations. For example, data processing resources can be available as physical computers or VM instances in a number of different configurations. The VM instances can be configured to execute applications, including web servers, servers, media servers, database servers, some or all of the network services described above, and/or other types of programs. Data storage resources can include file storage devices, block storage devices, and the like. The SMS 102 can also include and utilize other types of computing resources not mentioned specifically herein.

As also discussed above, the computing resources provided by the SMS 102 are enabled in one implementation by one or more data centers 1004A-1004D (which might be referred to herein singularly as "a data center 1004" or collectively as "the data centers 1004"). The data centers 1004 are facilities utilized to house and operate computer systems and associated components. The data centers 1004 typically include redundant and backup power, communications, cooling, and security systems. The data centers 1004 can also be located in geographically disparate locations. One illustrative configuration for a data center 1004 that can be utilized to implement the technologies disclosed herein will be described below with regard to FIG. 11.

The users can access the services provided by the SMS 102 over a network 1002, which can be a wide area communication network ("WAN"), such as the Internet, an intranet or an Internet service provider ("ISP") network or a combination of such networks. For example, and without limitation, a computing device 1000 operated by a user or other user of the SMS 102, such as the computing device 134, can be utilized to access the SMS 102 by way of the network 1002. It should be appreciated that a local-area network ("LAN"), the Internet, or any other networking topology known in the art that connects the data centers 1004 to remote users and other users can be utilized. It should also be appreciated that combinations of such networks can also be utilized.

Figure 11:
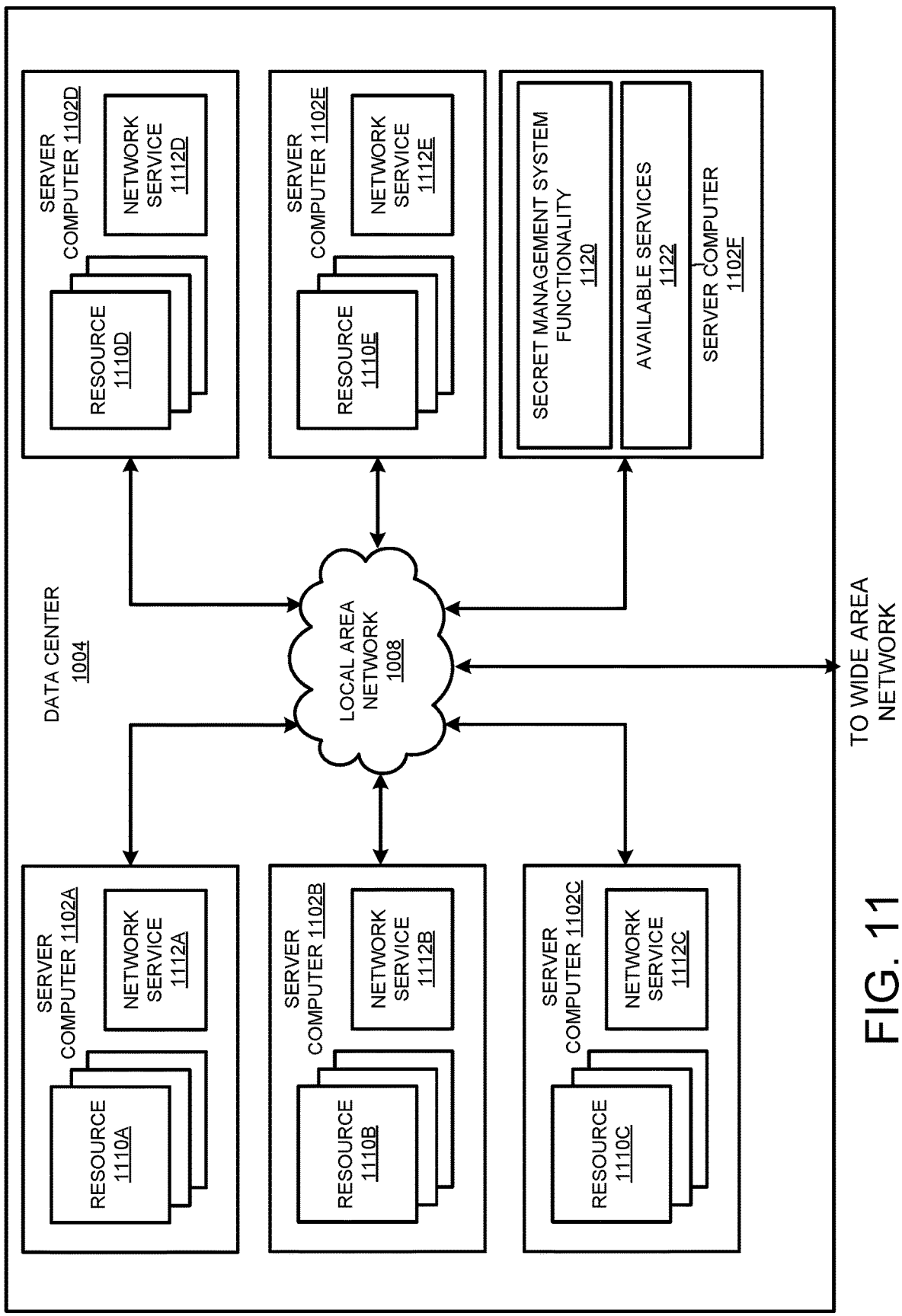
FIG. 11 is a computing system diagram illustrating a configuration for a data center that can be utilized to implement aspects of the technologies disclosed herein.

FIG. 11 is a computing system diagram that illustrates examples for a data center 1004 that can be utilized to manage replication of secrets across regions, and the other functionality disclosed herein. The example data center 1004 shown in FIG. 11 includes several server computers 1102A-1102F (which might be referred to herein singularly as "a server computer 1102" or in the plural as "the server computers 1102").

The server computers 1102 can be standard tower, rackmount, or blade server computers configured appropriately for providing various types of computing resources 1110 for implementing the functionality disclosed herein. As mentioned above, the computing resources 1110 provided by the data center 1004 can be data processing resources such as VM instances or hardware computing systems, data storage resources, database resources, networking resources, and others. Some of the servers 1102 can also be configured to execute network services 1112A-1112E, respectively, capable of instantiating, providing and/or managing the computing resources 1110A-1110E.

The data center 1004 shown in FIG. 11 also includes a server computer 1102F that can execute some or all of the software components described above. For example, and without limitation, the server computer 1102F can be configured to execute functionality described herein, such as secret management system functionality 1120 and other available services 1122. The server computer 1102F can also be configured to execute other components and/or to store data for providing some or all of the functionality described herein. In this regard, it should be appreciated that components or different instances of the services can execute on many other physical or virtual servers in the data centers 1004 in various configurations.

In the example data center 1004 shown in FIG. 11, an appropriate LAN 1108 is also utilized to interconnect the server computers 1102A-1102F. The LAN 1108 is also connected to the network 1002 illustrated in FIG. 10. It should be appreciated that the configuration of the network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1004A-1004D, between each of the server computers 1102A-1102F in each data center 1004, and, potentially, between computing resources 1110 in each of the data centers 1004. It should be appreciated that the configuration of the data center 1004 described with reference to FIG. 11 is merely illustrative and that other implementations can be utilized.

Figure 12:
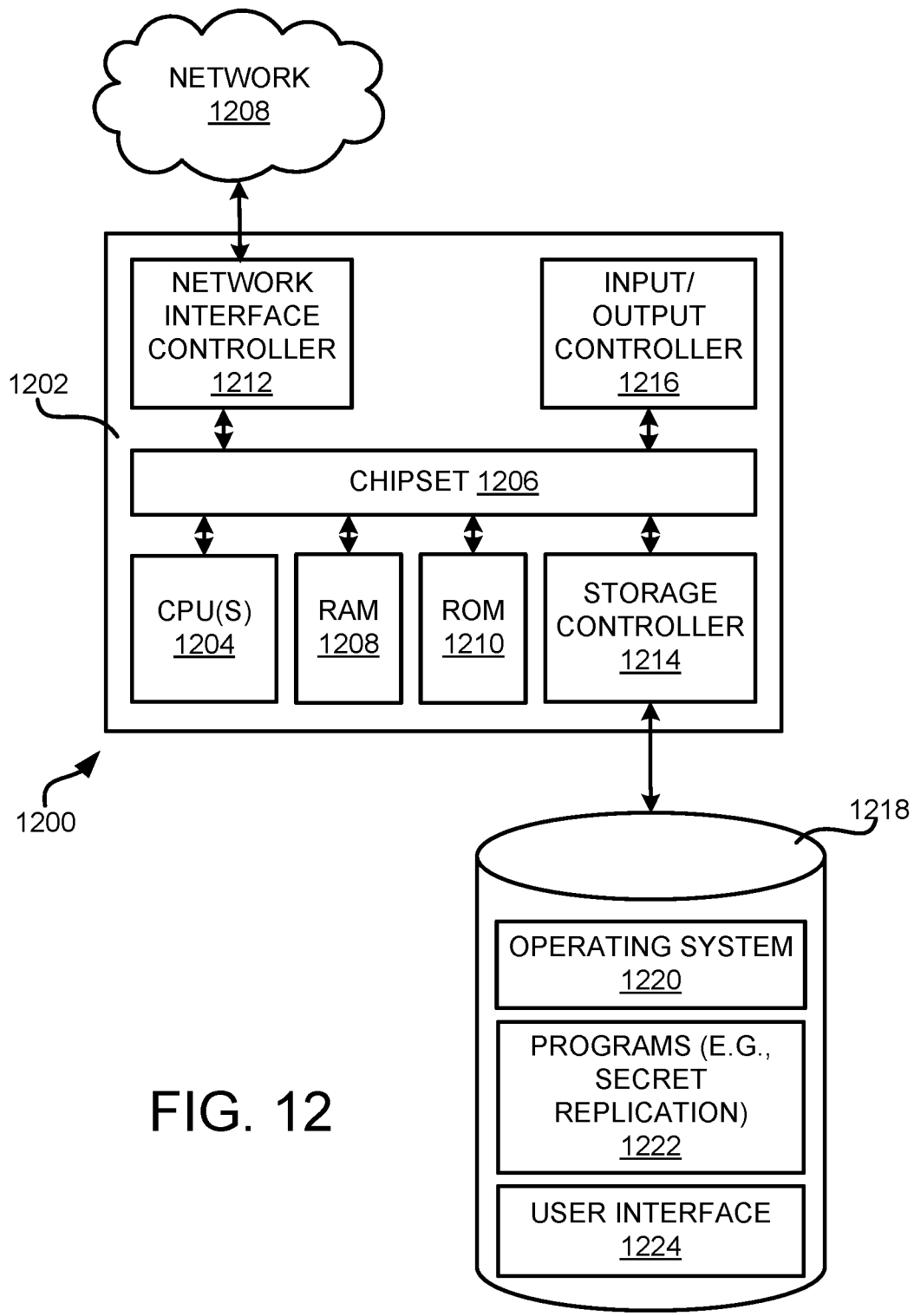
FIG. 12 is a computer architecture diagram showing an illustrative computer hardware architecture for implementing a computing device that can be utilized to implement aspects of the various technologies presented herein.

FIG. 12 shows an example computer architecture for a computer 1200 capable of executing program components for implementing the functionality described above. The computer architecture shown in FIG. 12 illustrates a conventional server computer, workstation, desktop computer, laptop, tablet, network appliance, e-reader, smartphone, or other computing device, and can be utilized to execute any of the software components presented herein.

The computer 1200 includes a baseboard 1202, or "motherboard," which is a printed circuit board to which a multitude of components or devices can be connected by way of a system bus or other electrical communication paths. In one illustrative configuration, one or more central processing units ("CPUs") 1204 operate in conjunction with a chipset 1206. The CPUs 1204 can be standard programmable processors that perform arithmetic and logical operations necessary for the operation of the computer 1200.

The CPUs 1204 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 can provide an interface to a RAM 1208, used as the main memory in the computer 1200. The chipset 1206 can further provide an interface to a computer-readable storage medium such as a read-only memory ("ROM") 1210 or non-volatile RAM ("NVRAM") for storing basic process that help to startup the computer 1200 and to transfer information between the various components and devices. The ROM 1210 or NVRAM can also store other software components necessary for the operation of the computer 1200 in accordance with the configurations described herein.

The computer 1200 can operate in a networked environment using logical connections to remote computing devices and computer systems through a network, such as the network 1208. The chipset 1206 can include functionality for providing network connectivity through a NIC 1212, such as a gigabit Ethernet adapter. The NIC 1212 is capable of connecting the computer 1200 to other computing devices over the network 1208. It should be appreciated that multiple NICs 1212 can be present in the computer 1200, connecting the computer to other types of networks and remote computer systems.

The computer 1200 can be connected to a mass storage device 1218 that provides non-volatile storage for the computer. The mass storage device 1218 can store an operating system 1220, programs 1222, workload control user interface 1224, and data, which have been described in greater detail herein. The mass storage device 1218 can be connected to the computer 1200 through a storage controller 1214 connected to the chipset 1206. The mass storage device 1218 can consist of one or more physical storage units. The storage controller 1214 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1200 can store data on the mass storage device 1218 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1218 is characterized as primary or secondary storage, and the like.

For example, the computer 1200 can store information to the mass storage device 1218 by issuing instructions through the storage controller 1214 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 can further read information from the mass storage device 1218 by detecting the physical states or characteristics of one or more particular locations within the physical storage units.

In addition to the mass storage device 1218 described above, the computer 1200 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1200.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1218 can store an operating system 1220 utilized to control the operation of the computer 1200. According to examples, the operating system comprises the LINUX operating system or one of its variants. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 1218 can store other system or application programs and data utilized by the computer 1200.

In examples, the mass storage device 1218 or other computer-readable storage media is encoded with computer-executable instructions which, when loaded into the computer 1200, transform the computer from a general-purpose computing system into a special-purpose computer capable of implementing the configurations described herein. These computer-executable instructions transform the computer 1200 by specifying how the CPUs 1204 transition between states, as described above. According to examples, the computer 1200 has access to computer-readable storage media storing computer-executable instructions which, when executed by the computer 1200, perform the various processes described above with regard to FIGS. 1-12. The computer 1200 can also include computer-readable storage media for performing any of the other computer-implemented operations described herein.

The computer 1200 can also include one or more input/output controllers 1216 for receiving and processing input from a number of input devices, such as a keyboard, a mouse, a touchpad, a touch screen, an electronic stylus, or other type of input device. Similarly, an input/output controller 1216 can provide output to a display, such as a computer monitor, a flat-panel display, a digital projector, a printer, or other type of output device. It will be appreciated that the computer 1200 might not include all of the components shown in FIG. 12, can include other components that are not explicitly shown in FIG. 12, or can utilize an architecture completely different than that shown in FIG. 12.

Based on the foregoing, it should be appreciated that technologies for management of replicating secrets across regions have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system comprising:
one or more processors; and
one or more computer-readable media storing computer-executable instructions that, when executed by the one or more processors, cause the one or more processors to:
receive a request, from a computing device associated with a customer of a service provider network, to replicate a secret from a primary geographical region of the service provider network to other geographical regions of the service provider network, wherein the secret is any data that is to be kept unknown or unseen by others;

determine that the request is authorized based on a determination that the customer is authorized to replicate the secret from the primary geographical region to each of the other geographical regions;
access the secret from a data store in the primary geographical region;
access metadata associated with the secret, wherein the metadata includes a description of the secret;
generate, based on the secret, encrypted secrets for the other geographical regions, wherein generating an encrypted secret for one of the other geographical regions includes accessing a respective geographical key for the one of the other geographical regions and using the geographical key to generate the encrypted secret for the one of the other geographical regions, wherein each of the other geographical regions has a distinct corresponding geographical key;
generate replication messages that instruct the other geographical regions to replicate the secret, wherein each replication message of the replication messages includes one of the encrypted secrets and the metadata associated with the secret;
transmit the replication messages to the other geographical regions; and
provide, to the computing device associated with the user, an indication of completion of replication of the secret to each of the other geographical regions.

2. The system of claim 1, wherein the instructions further cause the system to expose an application programming interface (API) that provides functionality for replicating secrets across regions of the service provider network, and wherein the request is made using the API.

3. The system of claim 1, wherein the instructions further cause the system to:
generate a graphical user interface (GUI) that includes user interface (UI) elements that, upon selection, are configured to identify the secret and identify each of the other geographical regions; and
providing, for display, the GUI to the computing device of the user.

4. The system of claim 1, wherein the instructions further cause the system to:
rotate the secret in the primary geographical region to a new secret; and
propagate the new secret to the other geographical regions.

5. A computer-implemented method comprising:
receiving a request, from a computing device associated with a user of a service provider network, to perform one or more operations that relates to replication of a secret from a first geographical region to one or more second geographical regions, wherein the one or more operations include at least one of replicating the secret, creating and replicating the secret, ceasing replication of the secret, or obtaining information about the first geographical region and the one or more second geographical regions in which the secret is to be replicated;
generating one or more encrypted secrets, based on the secret, for the one or more second geographical regions, wherein generating the one or more encrypted secrets for the one or more second geographical regions includes accessing a respective geographical key for one of the one or more second geographical regions and using the geographical key to generate an encrypted secret of the one or more encrypted secrets for the one of the one or more second geographical regions, wherein each of the one or more second geographical regions has a distinct corresponding geographical key;
generating one or more replication messages that instruct the one or more second geographical regions to replicate the secret, wherein the one or more replication messages include at least one of the one or more encrypted secrets;
causing the one or more replication messages to be provided to the one or more second geographical regions; and
sending, to the computing device associated with the user, data associated with performance of the one or more operations.

6. The computer-implemented method of claim 5, further comprising exposing an application programming interface (API) that exposes functionality for managing and replicating secrets across different regions of the service provider network, and wherein the request is made using the API.

7. The computer-implemented method of claim 5, further comprising:
generating a graphical user interface (GUI) that includes user interface (UI) elements that, upon selection, are configured to identify the secret to be replicated and identify the one or more second geographical regions; and
sending, for display, the GUI to the computing device of the user.

8. The computer-implemented method of claim 5, further comprising:
rotating the secret in the first geographical region to a new secret; and
propagating the new secret to the one or more second geographical regions.

9. The computer-implemented method of claim 5, wherein generating the one or more encrypted secrets comprises using a respective key associated with individual ones of the one or more second geographical regions for encryption of the secret.

10. The computer-implemented method of claim 5, wherein the request specifies to change a replicated secret to a stand-alone secret, that removes the replication of the secret, in one or more of the one or more second geographical regions.

11. The computer-implemented method of claim 5, further comprising determining that the request is authorized based at least in part a determination that the user is authorized to replicate the secret from the first geographical region to the one or more second geographical regions.

12. The computer-implemented method of claim 5, further comprising:
receiving one or more keys to use for at least one of encryption, decryption, or rotation; and
using the one or more keys to perform the at least one encryption, decryption, or rotation for individual at least one of the secret or one more of the encrypted secrets.

13. The computer-implemented method of claim 5, further comprising:
accessing metadata associated with the secret; and
causing the metadata to be sent to the one or more second geographical regions.

14. A system, comprising:
one or more processors; and
a non-transitory computer-readable storage medium having instructions stored thereupon which, when executed by the one or more processors, cause the system to perform actions, comprising:

receiving a request, from a computing device associated with a user of a service provider network, to perform one or more operations that relates to replication of a secret from a first geographical region to one or more second geographical regions, wherein the one or more operations is at least one of replicating the secret, creating and replicating the secret, ceasing replication of the secret, or obtaining information about the first geographical region and the one or more second geographical regions in which the secret is replicated;

generating one or more encrypted secrets, based on the secret, for the one or more second geographical regions, wherein generating the one or more encrypted secrets for the one or more second geographical regions includes accessing a respective geographical key for one of the one or more second geographical regions and using the geographical key to generate an encrypted secret of the one or more encrypted secrets for the one of the one or more second geographical regions, wherein each of the one or more second geographical regions has a distinct corresponding geographical key;

generating one or more replication messages that instruct the one or more second geographical regions to replicate the secret, wherein the one or more replication messages include at least one of the one or more encrypted secrets;

causing the one or more replication messages to be provided to the one or more second geographical regions; and sending, to the computing device associated with the user, data associated with performance of the one or more operations.

15. The system of claim 14, the actions further comprising exposing an application programming interface (API) that exposes functionality for managing and replicating secrets across different regions of the service provider network, and wherein the request is made using the API.

16. The system of claim 14, the actions further comprising:

generating a graphical user interface (GUI) that includes user interface (UI) elements that, upon selection, are configured to identify the secret to be replicated and identify the one or more second geographical regions; and sending, for display, the GUI to the computing device of the user.

17. The system of claim 14, the actions further comprising:

rotating the secret in the first geographical region to a new secret; and propagating the new secret to the one or more second geographical regions.

18. The system of claim 14, wherein generating the one or more encrypted secrets comprises using a respective key associated with individual ones of the one or more second geographical regions for encryption of the secret.

19. The system of claim 14, wherein the request specifies to change a replicated secret to a stand-alone secret, that removes the replication of the secret, in one or more of the one or more second geographical regions.

20. The system of claim 14, the actions further comprising:

accessing metadata associated with the secret; and causing the metadata to be provided to the one or more second geographical regions.

* * * * *